(12) United States Patent
Partee

(10) Patent No.: US 10,698,290 B2
(45) Date of Patent: Jun. 30, 2020

(54) ADVANCED BLOCKING PATTERN STRUCTURES, APPARATUS AND METHODS FOR A SPATIAL LIGHT MODULATOR

(71) Applicant: Steel City Optronics, LLC, Longmont, CO (US)

(72) Inventor: Charles Partee, Golden, CO (US)

(73) Assignee: Steel City Optronics, LLC, Longmont, CO (US)

(*) Notice: Subject to any disclaimer, the term of this patent is extended or adjusted under 35 U.S.C. 154(b) by 230 days.

(21) Appl. No.: 15/977,996

(22) Filed: May 11, 2018

(65) Prior Publication Data

US 2019/0346736 A1 Nov. 14, 2019

(51) Int. Cl.
| | |
|---|---|
| *G02F 1/01* | (2006.01) |
| *G02B 26/00* | (2006.01) |
| *G02F 1/29* | (2006.01) |
| *H01Q 3/26* | (2006.01) |

(52) U.S. Cl.
CPC ........... *G02F 1/292* (2013.01); *H01Q 3/2676* (2013.01); *G02F 2203/12* (2013.01); *G02F 2203/13* (2013.01)

(58) Field of Classification Search
CPC .. G02F 1/292; G02F 2203/12; G02F 2203/13; H01Q 3/2676
USPC ...... 359/238, 484.01, 484.02, 484.03, 484.1; 342/22, 179; 250/237 R
See application file for complete search history.

(56) References Cited

U.S. PATENT DOCUMENTS

| | | | |
|---|---|---|---|
| 4,495,492 A | 1/1985 | Anderson et al. |
| 4,497,545 A | 2/1985 | Ross |
| 4,550,389 A | 10/1985 | Cox et al. |
| 4,550,983 A | 11/1985 | Ross |
| 4,563,236 A | 1/1986 | Ross et al. |
| 4,578,321 A | 3/1986 | Ross et al. |
| 4,661,809 A | 4/1987 | Anderson et al. |
| 6,876,481 B2 | 4/2005 | Inoue et al. |
| 8,855,431 B2 | 10/2014 | Donoho |
| 8,941,431 B2 | 1/2015 | Granhaug et al. |

(Continued)

OTHER PUBLICATIONS

Babacan, et al., Compressive Passive Millimeter-Wave Imaging, 2011 18th IEEE Conference on Imaging. A publication month is not of issue since publication at any time in 2011 is sufficiently early.

(Continued)

*Primary Examiner* — William Choi
(74) *Attorney, Agent, or Firm* — Pritzkau Patent Group, LLC

(57) ABSTRACT

A system passively images a scene using an antenna for collecting electromagnetic energy from the scene and directing the electromagnetic energy toward a single pixel sensor. A spatial light modulator includes a flexible tape that supports a series of blocking patterns along its length. The tape moves through the electromagnetic energy in an exposure region as the energy travels from the antenna to the sensor and the tape moves on a transport path that is nonlinear outside of the exposure region. A processor captures a set of output values from the sensor to form an image of the scene based on the set of output values. Two blocking pattern structures, either rigid or flexible, can be superimposed in an exposure region between an antenna and a sensor.

33 Claims, 16 Drawing Sheets

(56) References Cited

U.S. PATENT DOCUMENTS

2013/0257646 A1* 10/2013 Gopalsami ........... G01K 11/006
342/179

OTHER PUBLICATIONS

Heidari, et al., A 2D Camera Design with a Single-pixel Detector, 2009 34th International Conference on Infrared, Millimeter, and Terahertz Waves. A publication month is not of issue since publication at any time in 2009 is sufficiently early.

Office Action for co-pending U.S. Appl. No. 15/265,830 dated May 10, 2018.

Spinoulas, et al., Optimized compressive sampling for passive millimeter-wave imaging, published Sep. 7, 2012.

Uzi Efron, Spatial Light Modulator Technology Materials, Devices and Applications; pp. 361-371, copyright 1995. A publication month is not of issue since publication at any time in 1995 is sufficiently early.

* cited by examiner

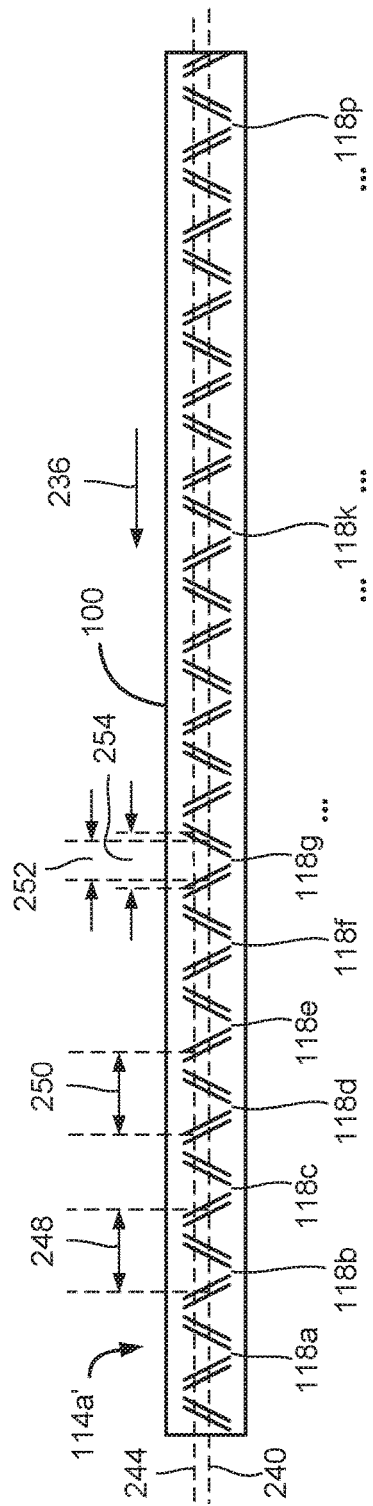
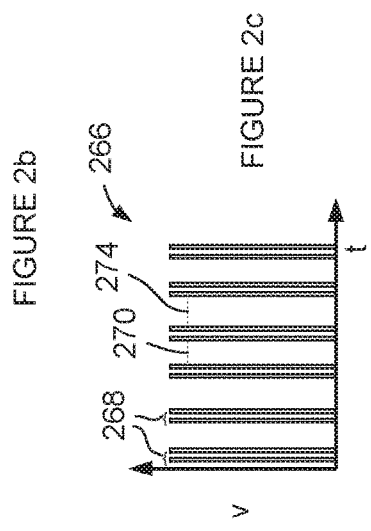
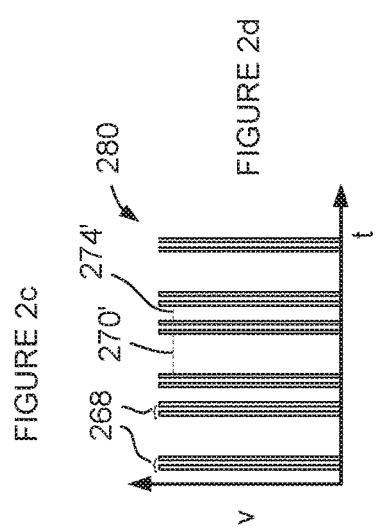

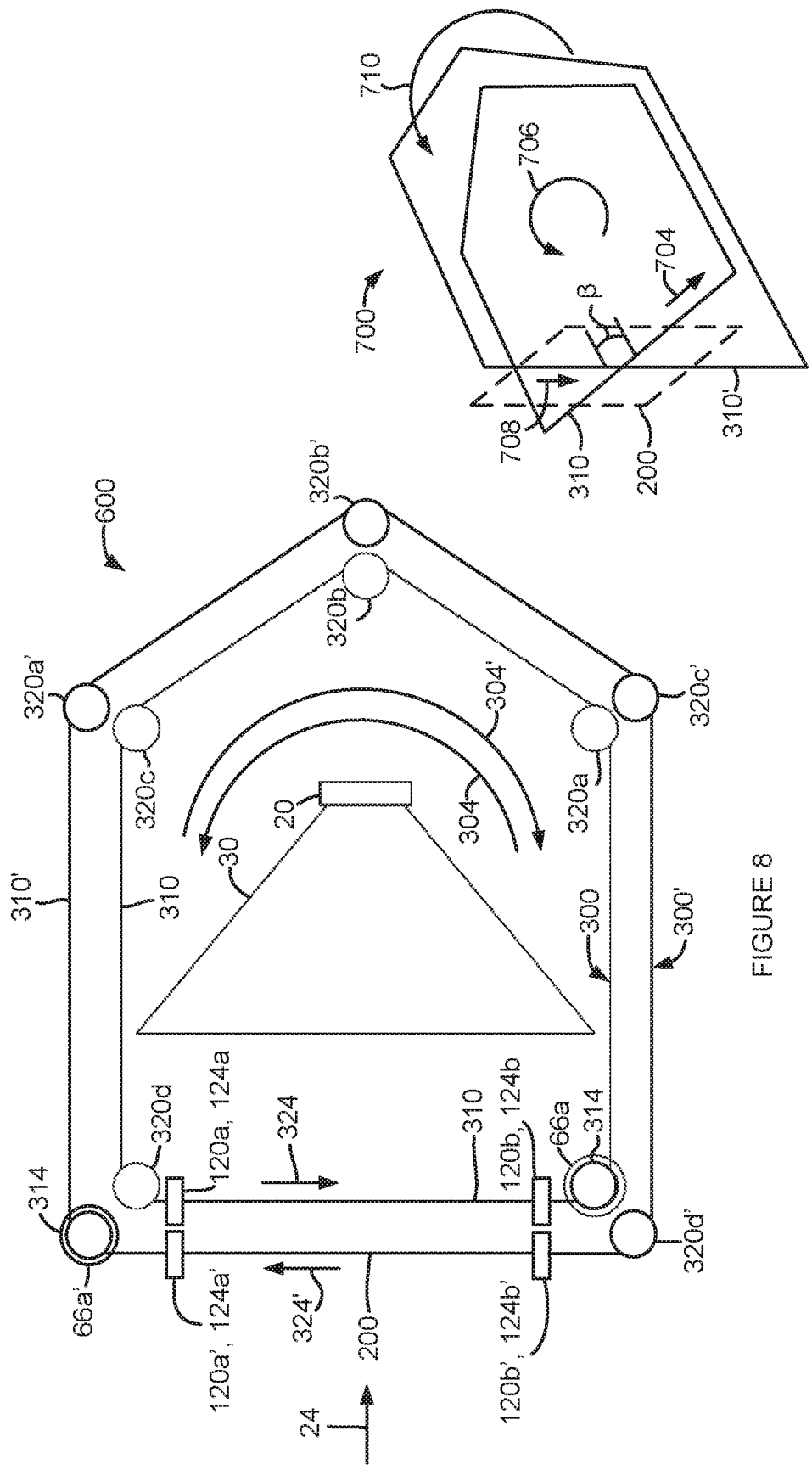

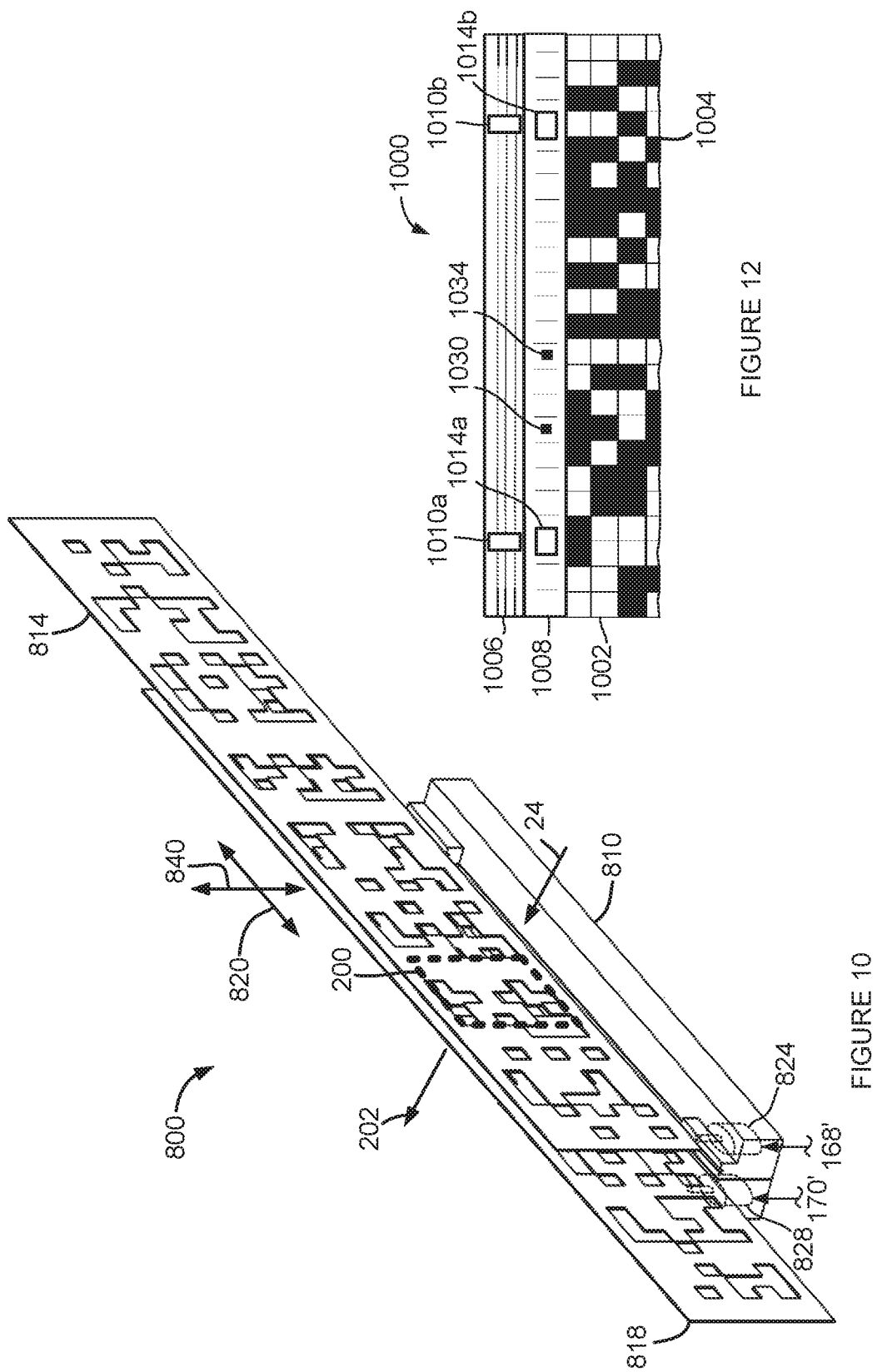

ADVANCED BLOCKING PATTERN STRUCTURES, APPARATUS AND METHODS FOR A SPATIAL LIGHT MODULATOR

BACKGROUND

The present invention is generally related to the field of the modulation of light and, more particularly, to an advanced spatial light modulator and associated methods as well its application to imaging using wavelengths longer than visible light, including but not limited to millimeter wave imaging.

Applicants recognize that is well known in the art to use a spatial light modulator, or SLM, in an imaging application. Published designs have attempted to apply the technique of compressive sampling and a single imaging sensor in order to achieve higher resolution than is possible with a single sensor alone. This approach has been used in cases where the imaging sensor is of a specialty type and/or comparatively expensive and it is not desirable to create an N×N matrix of imaging sensors (i.e., pixels) to generate an image with N×N resolution. In one example, millimeter wave sensors are expensive and a multi-pixel millimeter wave sensor array can cost hundreds of thousands of dollars.

Compressive sampling requires the generation of a series of blocking patterns, such as, for example, Hadamard patterns. In the visible light regime, these patterns are commonly generated by solid-state spatial light modulators, such as, for example, LCDs, or nearly solid-state spatial light modulators, such as, for example, micro-mirror arrays. Additionally, imaging systems for utilizing compressive sampling and a single-pixel sensor have been attempted in longer wavelength imaging, such as terahertz imaging (300 GHz-3000 GHz) and millimeter wave (30-300 Ghz). In one prior art approach for compressive sampling at longer wavelengths, the series of Hadamard (or other) blocking patterns is generated using a series of individual rigid physical masks because solid-state spatial millimeter wave modulators are not available. Each mask defines one blocking pattern as an array of cells wherein each cell exhibits a transmissivity status that is either transmissive or non-transmissive. In these designs, therefore, each mask must be physically sequentially moved into what is referred to as an active area in front of the sensor. In one implementation of this approach, for example, a mask is placed in the active area in front of the sensor, the image captured, the mask removed, and then the next mask placed in turn, another image captured, and so forth, generating the series of images that can be used to mathematically convolve the final image. This manipulation of rigid masks is slow and can require many seconds to generate an image. It is preferable for there to be a significant change in the blocking pattern from one mask to the next, such as at least 20% of the cells switching transmissivity status from one blocking pattern to the next, with the changes generally uniformly distributed throughout the cell array that makes up the blocking pattern. Because each mask is removed completely and replaced by another mask, such a significant change is readily accomplished.

In another approach that has been taken by the prior art, the series of blocking patterns is generated by mechanically laterally translating a single physical mask that contains all the required blocking patterns in front of the sensor such that the sensor responds only to a portion of the single physical mask that falls within the active area of the sensor. This approach eliminates the cumbersome requirement of removing and replacing the individual masks but the single mask is much larger in its lateral extents and, therefore, relatively slow to translate. Of course, in order to mimic the aforedescribed series of individual masks, this single physical mask must translate or move laterally by a distance that is at least equal to the width or height of one mask of the series of individual masks to behave in the same manner such that a series of portions of the single physical mask matches up with the series of individual masks.

In still another approach, that has been taken by the prior art, the single physical mask is moved by a lesser amount, perhaps corresponding to some number of rows or columns or cells of the cell array, but at any rate, less that the full width or height of the cell array that makes up each one of the individual masks. While this saves time by reducing translation time and also reduces mask size, the change from one successive blocking pattern to the next is likewise reduced which can reduce image quality given some fixed number of blocking patterns.

The foregoing examples of the related art and limitations related therewith are intended to be illustrative and not exclusive. Other limitations of the related art may become apparent to those of ordinary skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the above described problems have been reduced or eliminated.

In general, a system and associated methods are described for passive imaging of a scene. In one aspect of the disclosure, the system includes a single pixel sensor. An antenna collects electromagnetic energy from the scene and directs the electromagnetic energy toward the single pixel millimeter wave sensor. At least a first flexible tape supports a first series of blocking patterns along a first lengthwise dimension of the first flexible tape. A tape transport supports the first flexible tape for movement to transit the first flexible tape linearly through the electromagnetic energy in an exposure region as the electromagnetic energy is traveling from the antenna to the single pixel sensor and the first flexible tape moves on a first tape transport path that is, at least in part, nonlinear outside of the exposure region. A processor is configured for capturing a set of output values from the single pixel sensor such that each output value is responsive to one of the blocking patterns of the first series of blocking patterns and for forming an image of the scene based on the set of output values associated with the first series of blocking patterns.

In another aspect of the disclosure, a spatial light modulator and associated method are applicable to a system for passive imaging of a scene, which system includes a single pixel sensor, an arrangement for collecting electromagnetic energy from the scene and directing the electromagnetic energy toward the single pixel sensor, and a processor for capturing a set of output values from the single pixel sensor such that each output value is responsive to one blocking pattern of a series of blocking patterns. The spatial light modulator includes a flexible tape supporting the series of blocking patterns along a first lengthwise dimension of the flexible tape. A tape transport supports the flexible tape for movement to transit the flexible tape with the series of blocking patterns linearly through the electromagnetic energy in an exposure region as the electromagnetic energy is traveling from the collecting arrangement to the single pixel sensor and the flexible tape moves on a tape transport path that is, at least in part, nonlinear outside of the exposure region.

In another aspect of the disclosure, a system and associated method are described for passive imaging of a scene. The system includes a single pixel sensor. An antenna collects electromagnetic energy from the scene and directs the electromagnetic energy onto the single pixel sensor. A first blocking pattern structure and a second blocking pattern structure are arranged in a spaced apart, series relationship in a path along which the electromagnetic energy travels from the antenna to the single pixel sensor such that no more than a first portion of the first blocking pattern structure and no more than a second portion of the second blocking pattern structure are exposed to the electromagnetic energy in the path. A transport moves the first blocking pattern structure and the second blocking pattern structure relative to one another, transverse to the path, responsive to a first drive signal and a second drive signal, respectively. A processor generates the first drive signal and the second drive signal such that the first blocking pattern structure cooperates with the second blocking pattern structure to produce a series of blocking patterns by changing the first portion and the second portion, that are exposed to the electromagnetic energy, and to capture a set of output values from the single pixel sensor such that each output value is responsive to one of the series of blocking patterns for forming an image of the scene based on the set of output values associated with the series of blocking patterns.

BRIEF DESCRIPTION OF THE DRAWINGS

Example embodiments are illustrated in referenced figures of the drawings. It is intended that the embodiments and figures disclosed herein are to be illustrative rather than limiting.

FIG. 2b is a diagrammatic illustration of an embodiment of a servo stripe that can be used in FIG. 2a.

FIG. 2c is a plot of a reader output responsive to an initial path shown in FIG. 2b.

FIG. 2d is another plot of a reader output responsive to a vertically shifted path shown in FIG. 2b.

FIG. 3 is a flow diagram that illustrates an embodiment for the operation of the system of FIGS. 1 and 2a.

FIG. 8 is a diagrammatic plan view of an embodiment of a continuous dual flexible tape loop spatial light modulator, produced in accordance with the present disclosure, that can be used in place of the spatial light modulator shown in FIG. 4.

FIG. 9 is a diagrammatic view, in perspective, of another embodiment of a continuous dual flexible tape loop spatial light modulator, produced in accordance with the present disclosure, that can be used in place of the spatial light modulator shown in FIG. 4.

FIG. 10 is a diagrammatic view, in perspective, of still another embodiment of a spatial light modulator that can be used in the system of FIGS. 1 and 2a, in accordance with the present disclosure.

FIG. 12 is a diagrammatic fragmentary illustration, in elevation, of a portion of a blocking pattern structure, shown here to illustrate additional details with regard to embodiments of servo stripes.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims.

Applicants hereby describe a novel mechanical spatial light modulator. Embodiments of this spatial light modulator (SLM) support compressive sampling and imaging systems that operate with electromagnetic waves (EMW) over a range of frequencies from 10 GHz to 10 THz (millimeter wave to terahertz spectrum), as well as over a range of frequencies from 30 GHz to 300 GHz (millimeter wave). An embodiment of this spatial light modulator used in conjunction with a sensor, an arrangement for directing EMW, and a compressive sampling algorithm comprises a millimeter wave imaging camera. Such a camera offers sweeping improvements over the state-of-the-art in millimeter wave imaging.

Some embodiments of the spatial light modulator (SLM) disclosed herein use a flexible substrate in place of the rigid substrates in the prior art. The substrate is largely transmissive in the wavelengths of interest. PET (polyethylene terephathalate) tape is suitable in millimeter wave. The substrate is selectively coated with a blocking material that is largely not transmissive in the wavelength of interest, such as copper or silver, to form the required blocking patterns. Metal impregnated ink is suitable for millimeter wave. These materials can be plated, printed, or deposited in many other ways. Periodically, an 'all-black' pattern can be used to calibrate the sensor. An 'all-clear' pattern might be used periodically to measure the total energy in the scene. The flexible substrate with the patterned blocking material may hereinafter be referred to as a tape.

Turning now to the drawings, it is noted that the figures are not to scale and are diagrammatic in nature in a way that is thought to best illustrate features of interest. Descriptive terminology such as, for example, upper/lower, top/bottom, horizontal/vertical and the like, may be adopted with respect to the various views provided in the figures for purposes of enhancing the reader's understanding and is in no way intended to be limiting. All embodiments described herein are submitted to be operational irrespective of any overall physical orientation. It is noted that like reference numbers may be used to refer to like items throughout the various figures.

Figure 1:
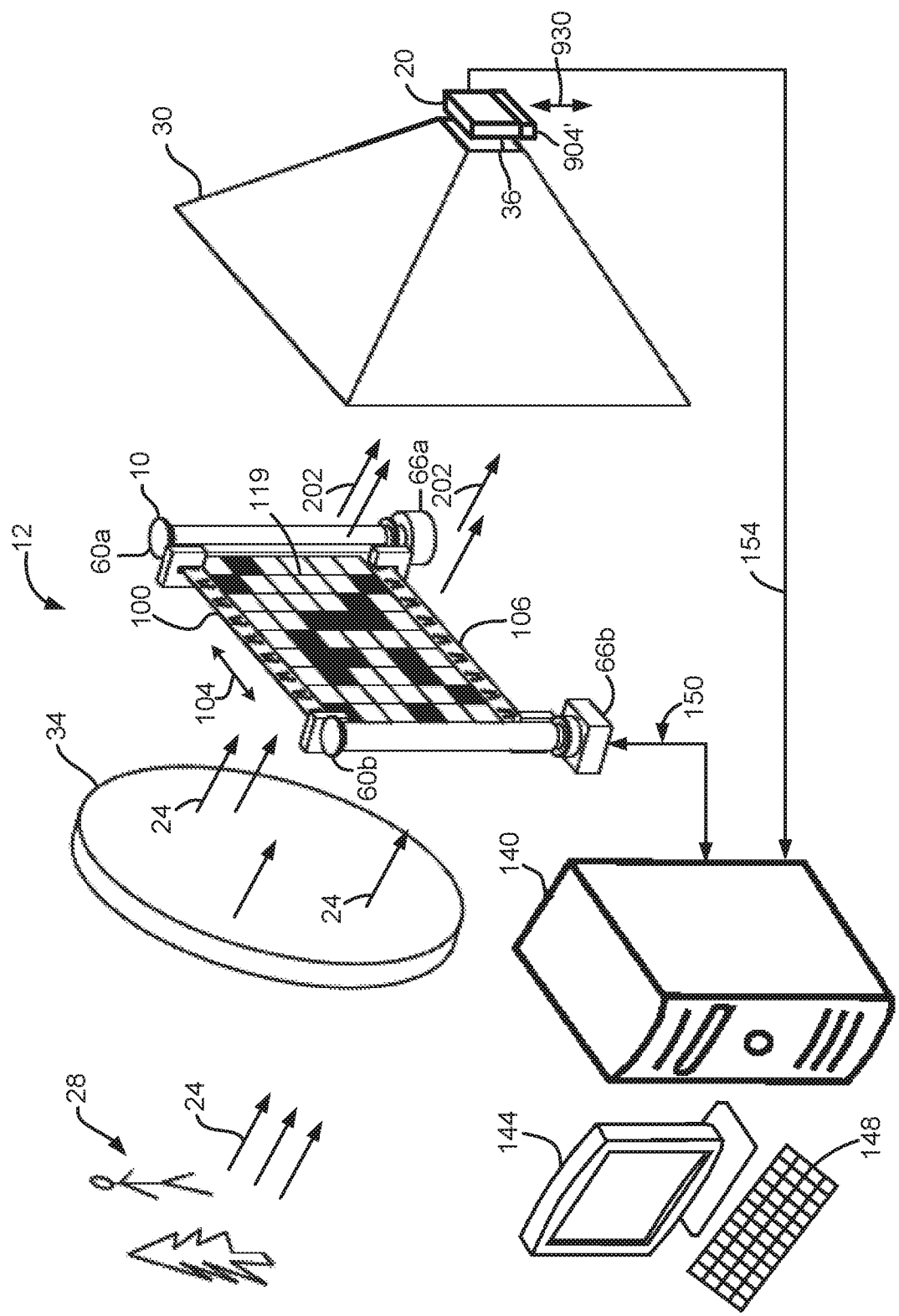
FIG. 1 is a diagrammatic view, in perspective, illustrating an embodiment of a spatial light modulator, produced in accordance with the present disclosure, as part of an overall millimeter wave imaging system.

FIG. 1 illustrates an embodiment of a spatial light modulator, indicated by the reference number 10, as part of an overall millimeter wave imaging system, generally indicated by the reference number 12. Beyond spatial light modulator 10, system 12 further includes a single pixel sensor 20, for sensing millimeter wave (MMW) radiation 24 from a scene 28, an electromagnetic horn 30 and an antenna 34 for directing MMW radiation 24 toward sensor 20. The sensor is at least arranged proximate to an aperture 36 of the horn or can be physically supported by the horn as well as by other packaging. Sensor 20 can be of any suitable type of single pixel sensor for millimeter waves in the present embodiment such as, for example, those available from Millitech, Faran Technology, QuinStar Technology, Inc., and Hughes Research Laboratories, LLC. A specific example is the DET-10 from Millitech. It is noted that certain manufacturers can provide a custom sensor, if so desired. Horn 30 can be formed, for example, from a suitable electrically conductive material. Antenna 34 can likewise be of any suitable form for directing millimeter waves such as, for example, a lens formed from polyethylene or a Cassegrain antenna formed from aluminum. In FIG. 1, antenna 34 is diagrammatically shown. A Cassegrain embodiment can include a parabolic antenna having a feed antenna mounted behind an aperture formed in the center of the surface of a concave main parabolic reflector dish. The feed antenna is arranged in front of the main dish (i.e., in the direction of scene 28 to direct radiation reflected from the dish back through spatial light modulator 10 and ultimately onto sensor 20 via horn 30. Of course, antenna 34 can be of a type that is suitable for the frequency range of interest. For example, a lens system formed of crown glass, among many others, would be appropriate for visible light (430-770 THz), a lens system formed of germanium might be used for infrared (300 GHz-430 THz), and a lens system formed of high-density polyethylene may be suitable for millimeter wave (30-300 GHz). Among reflective options, a parabolic antenna made of silver-backed silica glass may be appropriate for visible light, a parabolic antenna made of copper could be used for infrared, and a parabolic antenna made of aluminum may be appropriate for millimeter waves.

Figure 2A:
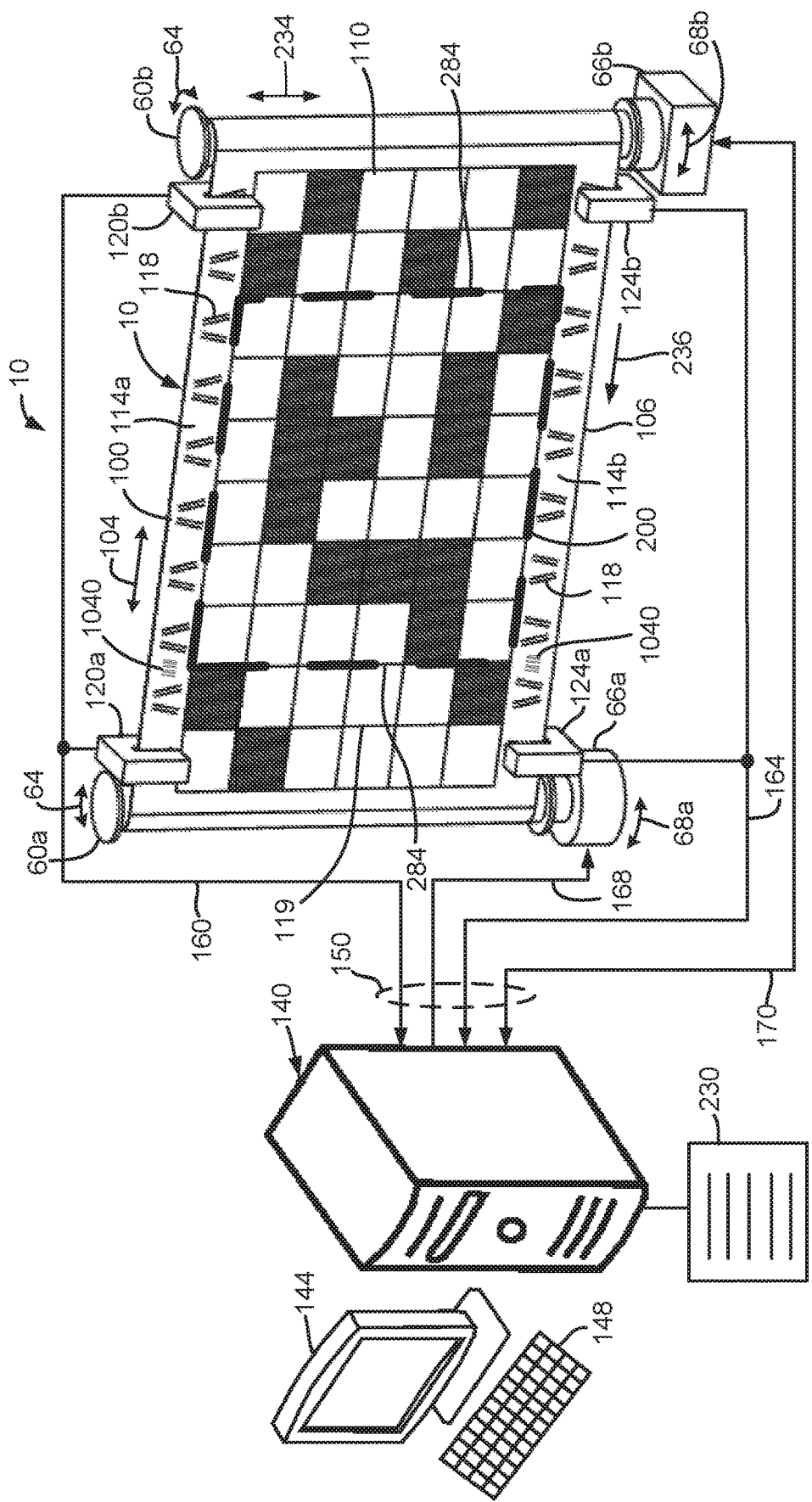
FIG. 2a is a further enlarged, diagrammatic perspective view illustrating additional details of the spatial light modulator of FIG. 1.

Referring to FIG. 2a in conjunction with FIG. 1, the former is a further enlarged, diagrammatic perspective view illustrating additional details of spatial light modulator 10 of FIG. 1. In this embodiment, the spatial light modulator includes first and second reels, spindles or spools 60a and 60b, respectively, each of which is supported for bidirectional rotation as indicated by arcs 64. Reel 60a can be bidirectionally driven by a first motor 66a, as indicated by a double headed arrow 68a, while reel 60b can be bidirectionally driven by a second motor 66b, as indicated by a double-headed arrow 68b. In the present embodiment, motor 66a is a stepper motor while motor 66b is a DC motor such that a flexible blocking pattern tape or ribbon 100 can be spooled bidirectionally between reels 60a and 60b, as indicated by a double headed arrow 104. It is noted that reels 60a and 60b along with associated motors 68a and 68b may be referred to herein as a flexible tape transport. A free or lateral portion 106 of the tape extends between reels 60a and 60b. In addition to a blocking pattern 110, tape 100 can carry an upper servo stripe 114a along each its upper lengthwise edge margin and a lower servo stripe along its lower lengthwise edge margin, each servo stripe including suitable servo marks 118, as will be further described. The servo stripes may be referred to collectively using the reference number 114. It is noted that the servo stripes and blocking pattern carry around spooled portions of tape 100 on reels 60a and 60b, however, this has not been shown due to illustrative constraints. It is also noted that a grid 119 defining the individual cells of the blocking patterns shown in FIGS. 1 and 2 is provided by way of illustration for purposes of descriptive clarity and is not required. Subsequent figures may not show such a grid. The tape transport of FIG. 2a, like all embodiments brought to light herein that employ a flexible tape, includes at least one linear portion (e.g., free portion 106) along which the flexible tape is moved linearly in a plane along a lengthwise dimension and a non-linear portion which, in the present embodiment are end portions of the flexible tape spooled on reels 60a and 60b. Accordingly, at least a portion of the overall tape transport path is nonlinear. First and second upper readers 120a and 120b, which may be referred to collectively as upper readers 120, are supported to read the upper servo stripe while first and second lower readers 124a and 124b, which may be referred to collectively as lower readers 124, are supported to read the lower servo stripe. It is noted that the upper and lower readers are supported independent of the support for motors 66a and 66b such that the readers detect relative movement of the tape which can be, for example, movement of the tape up and down on reels 60a and 60b or even relative vertical movement of these reels themselves. In some embodiments, only one servo stripe is needed, along with its associated readers. Each reader can operate, for example, based on emitting light from an LED and receiving the emitted light using a photodiode or phototransistor on an opposing side of the ribbon. Further details will be provided at appropriate points below with regard to the servo patterns, marks and readers. It is noted that, due to the use of stepper motor 66a, servo stripes 114 and the associated readers can be optional, as will be further discussed. In another embodiment, motor 66a, like motor 66b, can be a DC motor in which case, servo stripes 114 and the associated readers are required. In still another embodiment, a tensioning arrangement can maintain a suitable amount of tension on tape 100. Such a tensioning arrangement, for example, can comprise a roller or rod movable by a linear stage such that movement in one direction engages the flexible tape to increase tension while movement in an opposite direction reduces tension. A controller computer 140, which may be referred to as a processor, can include a monitor 144 and input device 148. In FIG. 1, an interface 150 is connected to spatial light modulator 10 to provide electrical communication with controller computer 140. A sensor signal line 154 provides signals from sensor 20 to controller computer 140. As seen in FIG. 2a, interface 150 includes a first reader interface 160 from upper servo readers 120a and 120b and a second reader interface 164 from lower servo readers 124a and 124b. The reader interfaces can provide an individual signal from each reader to processor 140 which can provide information relating to the status of flexible blocking pattern tape 100 such as, for example, being indicative of buckling along free portion 106. It is noted that power supply lines for the readers and other components have not been shown but are understood to be present. Drive signals for motor 66a are provided by a first motor drive interface 168 while drive signals for motor 66b are provided by a second motor drive interface 170. It is noted that the spool size (i.e., diameter) for reels 60a and 60b can be selected to balance various factors. For example, a relatively larger spool size (i.e., greater diameter) will result in lower stress on flexible tape 100, leading to longer life. On the other hand, such relatively larger reels consume more space and are likely more heavy.

As seen in FIG. 1, millimeter wave radiation 202 (i.e., a portion of incident radiation 24) emerges from tape 100, indicated by arrows, and travels toward sensor 20 for collection by horn 30 and concentration onto single pixel sensor 20. FIG. 2a illustrates an exposure region 200 that is planar and indicated by a heavy, dashed line, such that millimeter wave radiation 24 (FIG. 1) passing through region 200 is collected and, thereafter, incident on sensor 20. In the present example, region 200 forms a blocking pattern that is made up of a 6×6 array of cells. Generally, millimeter wave radiation that transits through tape 100 outside of region 200 such as, for example, through the servo stripes is rejected.

During operation of system 10, stepper motor 66a is driven by control computer 140 to controllably release or take up tape 100 to selectively establish the lateral segment of the tape that makes up the blocking pattern appearing in region 200. At the same time, control computer 140 drives DC motor 66b to maintain at least some degree of tension on free or suspended portion 106 of the tape extending between reels 60a and 60b, thereby ensuring that the free portion remains sufficiently planar or flat (i.e., linear). In this way, motors 66a and 66b can cooperatively and precisely position a series of different blocking patterns within region 200 with controller computer 140 capturing a reading from sensor 20 in association with each of the different blocking patterns. It should be appreciated that tape 100 can be moved in either direction by the motors. Reels 60a and 60b, as is the case with reels in other embodiments, can include features to guide the tape, such as contours, steps, texturing and/or flanges. In some embodiments, tape 100 is moved the full width of exposure region 200 from one blocking pattern to the next in the series, while, in other embodiments, the tape can be moved by an incremental amount that is less than the full width of region 200 from one blocking pattern to the next. It is noted that an incremental movement can be as small as the width of one cell of the blocking pattern. Movements by some multiple number of cell widths may produce a more acceptable change from one blocking pattern to the next, especially given Applicants' recognition that real life scenes tend to be self-correlated. In any embodiment that employs a flexible blocking pattern tape, a tape transport supports the flexible tape(s) for movement to transit the tape linearly through the electromagnetic energy in exposure region 200 as the electromagnetic energy is traveling from the antenna to the single pixel sensor. At the same time, the flexible tape moves on a tape transport path that is, at least in part, nonlinear outside of the exposure region.

Still referring to FIGS. 1 and 2a, flexible blocking pattern tape 100 includes a flexible substrate that is transmissive at the wavelength of interest. Suitable materials for visible light include, but are not limited to Novele and Polyethylene terephathalate (PET). Suitable materials for millimeter wave (MMW) radiation include, but are not limited to polyimide, PET, and Novele. Thus, transmissive cells are essentially comprised of the substrate material itself with no additional coatings or materials. For the "black" or non-transmissive cells, metallic coatings such as, for example, copper and silver can readily be made flexible at required thicknesses for wavelengths from optical to MMW radiation. The coatings can be applied to form the desired pattern on the substrate, for example, by electrodeposition through a mask, roll-to-roll processing, sheet deposition followed by chemical etching, and ink jet printing. It is noted that any suitable technique can be employed and that the size or dimensions of the cells can be suited to any desired wavelength. In another embodiment, the tape can be formed from a thin flexible metal such as, for example, steel having holes or apertures formed therein to define the transmissive cells of the blocking pattern. This latter embodiment can be very robust and can be suited to any desired wavelength by changing the dimensions of the cells. Moreover, enhanced stiffness, as compared to a plastic substrate, can enhance controllability.

As compared to a rigid substrate carrying the same pattern and thereby providing the same number of individual blocking patterns, the flexible tape implementations of the present disclosure can provide for a far more compact overall structure. Given the low weight of tape 100, the transport mechanism of FIGS. 1 and 2a, as well as other embodiments yet to be described, are capable of controllably transiting the tape at far greater speeds than have been achieved in prior art implementations employing a rigid substrate moved by a mechanical translation stage. In this regard, Applicants submit that tape transport rates of at least 1 meter per second and, for example, up to 20 meters per second can be accomplished. Imaging can be accomplished at rates up to at least 1 Hz and, for example, up to 60 Hz.

Figure 3:
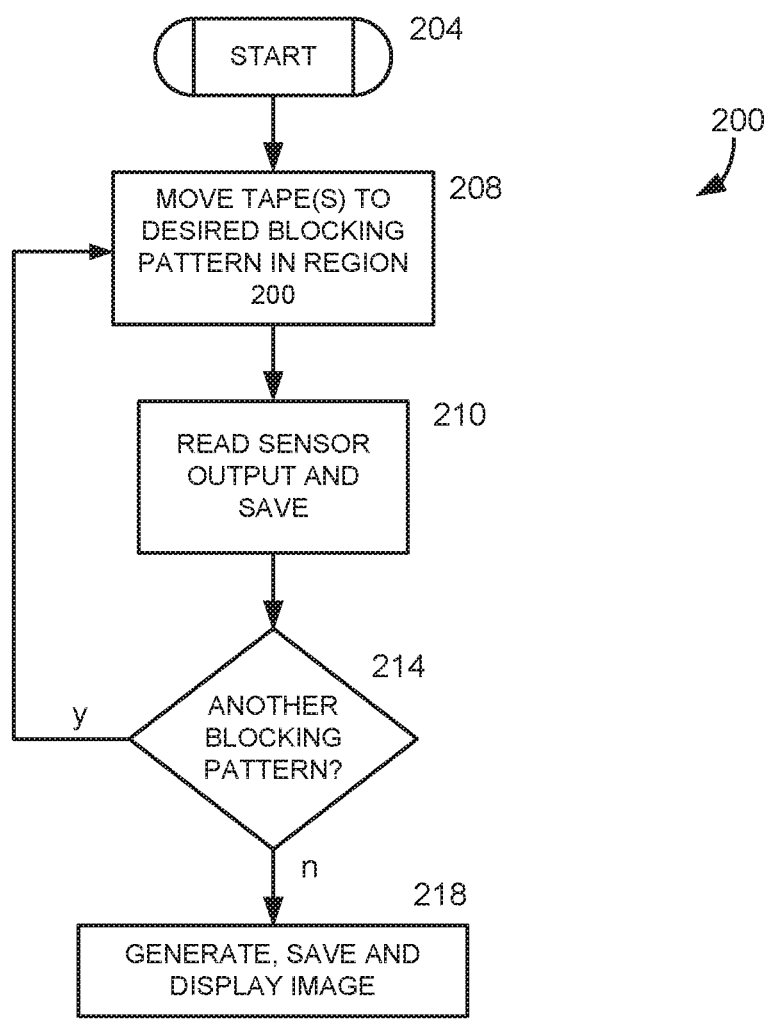

Having described structural details of spatial light modulator 10 above in the context of system 12, it is appropriate at this junction to consider aspects of its operation. FIG. 3 is an embodiment of a flow diagram, generally indicated by the reference number 200, for the operation of system 12 to generate an image. Generally, a set or series of blocking patterns is used such that a sensor output is recorded for each blocking pattern of the series. Relative increases in the number of blocking patterns in the series as well as increasing the number of cells that change or toggle between a transmissive status and a non-transmissive status from one blocking pattern to the next can serve to enhance image resolution and clarity. Any suitable series of blocking patterns can be used such as, for example, Hadamard patterns or randomly generated patterns. The method begins at start 204 and proceeds to 208 wherein controller computer 140 actuates motors 66a and 66b to move tape 100 such that a desired blocking pattern is positioned in exposure region 200. An initial or beginning blocking pattern can be the first pattern proximate to one of the opposing ends of the tape, although this is not a requirement. At 210, controller computer 140 reads the output of sensor 20, for example, via analog to digital conversion of the sensor voltage output, and saves that converted output. In the present embodiment, the sensor value is captured when tape 100 is stationary. In some embodiments, yet to be described, it is not necessary for the tape to be stationary based, at least in part, on the characteristics of the particular sensor that is in use, as will be further discussed. At 214, if another blocking pattern is needed for generating the image currently in process, operation returns to 208. On the other hand, if a sensor output has been obtained for every blocking pattern that is needed, operation proceeds to 218. An image is generated, at 218, by a compressive sampling method based on the saved set of sensor outputs. Compressed or compressive sensing (CS) techniques have been developed to aid in reconstructing a signal using a sampling rate that is below the Nyquist sampling rate. These techniques exploit the observation that most practical signals of interest have sparse representations using a specific transform. Thus, for a given signal, there may exist a particular transform space in which a majority of the transform coefficients are at or near zero. This transform space may be referred to as the sparsity space. As these small coefficients may be assumed to be zero without significant loss of signal quality (the sparseness assumption), signal reconstruction may be approximated by determining only the limited set of large transform coefficients for the sparsity space. In order to generate an image, compressive sensing requires the sensor output value for each blocking pattern as well as knowledge of the transmissivity state of each cell of each blocking pattern. Another image can be generated, perhaps as part of a video stream, by returning to start 204.

Referring to FIG. 2a, it should be appreciated that the amount of lateral movement of free portion 106 of tape 100 per step of stepper motor 66a is dependent upon the amount of tape that is spooled on reel 60a. As the amount of spooled tape increases, the amount of lateral tape movement per step increases correspondingly. Thus, movement of the tape to position the next blocking pattern of a series within exposure region 200 requires differing numbers of steps, depending on the current position of the tape. In one embodiment, the step count can be monitored throughout the movement of tape 100, beginning from a known, initial position to track the amount of tape on reel 60a and a current position of the tape. The amount of lateral movement per step for any given position of the tape can be determined a priori and stored, for example, in a lookup table 230 by processor/controller 140 that is accessed by step 208 of FIG. 3. In another embodiment, tape position can be tracked using at least one servo stripe 114 and associated readers. By starting from a known initial position, processor 140 can count the servo marks for purposes of controlling motor 66a to accurately track the position of tape 100. It should be appreciated that servo marks 118 have been shown diagrammatically in FIGS. 1 and 2. The servo marks can be provided at any suitable resolution or spacing and can be formed in the same way and from the same material as the non-transmissive cells of the blocking patterns, although this is not a requirement. As one example, the servo marks can be laterally spaced apart to indicate the start of each blocking pattern. As another example, the servo marks can be equally laterally spaced apart along the entire length of tape 100. As still another example, the servo marks can be spaced apart in a way that reflects the per step variation of lateral movement based on the amount of spooled tape on reel 60a, as discussed above. The particular shape of each servo mark will be discussed at an appropriate point hereinafter. As will be described in detail, the chevron pattern of the servo marks shown in FIGS. 1 and 2, provide for monitoring movement and position of tape 100 in both horizontal and vertical directions, as indicated by double-headed arrows 104 and 234 in FIG. 2a.

Chevron servo marks 118 in FIG. 2a are seen to each have a V-shape made up of two legs that are slightly spaced apart along the length of flexible tape 100. In the present embodiment, each V leg of a given chevron servo mark is made up of two parallel spaced apart non-transmissive bars, although any suitable number of one or more bars can be used. In some embodiments, the number of bars in the leading V-leg can be different than the number of bars in the trailing V-leg which provides for distinguishing between the two V-legs. For example, the leading V-leg can include 2 bars while the trailing V-leg includes 3 bars. In FIG. 2a, chevron servo marks 118 are spaced apart by a distance that is greater than the distance between the V-legs that make up each servo mark. This spacing provides for distinguishing between individual V-legs, for example, based on the output of a given reader. In the instance of the use of multiple bars in each individual leg, the time separation of the pulse output associated with each individual bar for a given leg can be averaged to provide a compensated time for the given V leg. It is noted that the bars that make up the leading V-legs of all the chevron servo marks (assuming that tape 100 is moving in the direction of an arrow 236 by way of example) are parallel with one another. Likewise, the bars that make up the trailing V-legs of all the chevron servo marks are likewise parallel with one another. The output of each reader in FIG. 2a is made up of a series of pulses responsive to one of these servo stripes.

Attention is now directed to FIG. 2b which is a diagrammatic illustration of another embodiment of a servo stripe, generally indicated by the reference number 114a', that can be used as either or both of the upper and lower servo stripes in FIG. 2a, although in the present example, it will be assumed that the upper servo stripe is illustrated. In this embodiment, chevron servo marks 118, selected ones of which are individually designated with an appended alphabetic character, cooperate to form a continuous zig-zag pattern. As is the case in FIG. 2a, the bars that make up the leading V-legs of all the chevron servo marks are parallel with one another. Likewise, the bars that make up the trailing V-legs of all the chevron servo marks are likewise parallel with one another. A first read path 240, indicated by a dashed line, represents an initial path along which tape 100 has transited past readers 120. A second read path 244, indicated by another dashed line, represents a shifted read path transited by readers 120 responsive to tape 100 shifting downward relative to the readers. By way of example, the leading V legs of adjacent chevron servo marks 118*b* and 118*c* are separated by a distance 248 along initial read path 240 while the leading V legs of adjacent chevron servo marks 118*d* and 118*e* are separated by a distance 250 along shifted read path 244. So long as read paths 240 and 244 are parallel with one another and are also parallel to a center line of servo stripe 114*a*', distance 248 is equal to distance 250, and will likewise be equal. In fact, any distances measured between any given adjacent pair of V legs and parallel to the centerline of servo stripe 114*a*' will be equal. Given this equidistant relationship, velocity of tape 100 can be determined based on detecting the timings at which leading V legs pass a given reader. Because of the symmetry of the chevron servo marks, the trailing V legs can be used for determining velocity rather than the leading V legs. It is also noted that the present discussion applies equally to servo stripes 114*a* and 114*b* of FIG. 2*a*.

Continuing to refer to FIG. 2*b*, it is appropriate at this juncture to consider the detection of vertical movement of tape 100, normal to transport direction 236 in the plane of the tape within exposure region 200, based on the examples provided by paths 240 and 244 and with reference to chevron servo mark 118*g*. For path 240, the leading and trailing V legs are separated by a distance 252. When tape 100 moves down corresponding, for instance, to path 244, however, the leading and trailing V legs are separated by a distance 254 that is greater than distance 252. Assuming a constant tape speed in direction 236, a time interval measured responsive to chevron servo mark 118*g* passing through a reader changes in response to the vertical position of the tape. That is, the time interval increases as the tape moves down and decreases as the tape moves up.

Referring to FIG. 2*c*, an output for one of readers 120 is diagrammatically plotted as a voltage, v, versus time, for initial path 240, generally indicated by the reference number 266. It is noted that the pulse output shown in FIG. 2*c* is responsive to chevron servo marks 118*e*-118*g* having the pulses shown in vertical alignment with the V legs of these chevron servo marks. As can be seen, a pulse pair 268 results from each V leg passing through the reader. If the centerline of the servo stripe is being read, all of the pulse pairs will be spaced apart by an equal time period, however, path 240 is slightly below the centerline such that a first interval 270 is less than a second interval 274. As will be seen, the relationship between interval 270 and interval 274 changes responsive to the read path through the servo stripe. One of ordinary skill in the art will recognize that the chevron servo marks that make up servo stripes 114*a* and 114*b* of FIG. 2*a* provide a similar relationship for purposes of detecting vertical tape movement.

Attention is now directed to FIG. 2*d* which diagrammatically illustrates another output for one of readers 120 plotted as a voltage, v, versus time, for shifted path 244, generally indicated by the reference number 280. Again, the pulse output shown in FIG. 2*d* is responsive to chevron servo marks 118*e*-118*g* having the pulses shown in vertical alignment with the V legs of these chevron servo marks. In this example, it is evident that a first modified interval 270' is now greater than a second modified interval 274' responsive to tape 100 having moved downward. Thus, a ratio between intervals 270 and 274 is indicative of vertical movement of tape 100. Of course, these intervals can be measured between the compensated timings of the pulse pairs (or any suitable number of pulses responsive to the number of bars in each V leg) when averaging is used in the manner described above. One of ordinary skill in the art will recognize that servo stripes 114*a* and 114*b* of FIG. 2*a* provide a similar output.

Based on the descriptions above, it should be clear that each reader independently measures the tape location relative to itself. In some embodiments, only one reader can be used. In the embodiment of FIG. 2*a*, four readers are positioned in proximity to exposure region 200. The measurements from the four readers can be averaged to reduce measurement error. The measurements can also be compared. Any differences in the compared measurements can indicate non-linear behavior in the tape, such as, for example, buckling or folding, in the exposure region. Accordingly, a feedback signal can be generated based on this mismatch, as will be further discussed at an appropriate point below.

Still referring to FIG. 2*a*, in another embodiment, spatial light modulator 12 can include a DC motor serving as motor 66*a* with at least one servo stripe 114 and its associated readers. In the instance of a single servo stripe, either the upper or lower servo stripe can be used. Of course, in any embodiment that uses a single servo stripe, at least a portion of the area of tape 100 dedicated to an unused servo stripe can be devoted to the blocking patterns. During operation, DC motors 66*a* and 66*b*, and processor 140 can move tape 100 such that a desired blocking pattern is accurately positioned within exposure region 200 based on servo reader outputs. Motion can then cease such that processor 140 can collect a reading from sensor 20 (FIG. 1) while the tape is stationary, prior to advancing to another blocking pattern, if needed. In another embodiment, sensor readings can be captured on-the-fly, while the tape is moving. This latter capability is dependent on the capture speed of sensor 20. If the capture speed is fast in comparison to the tape speed, the amount of movement of the tape during the sensor reading capture can be insignificant. For example, a capture speed of 10 microseconds per measurement during a tape speed of 1 m/s corresponds to tape movement of 10 microns during the capture time. A capture speed of 10 microseconds per measurement during a tape speed of 10 m/s corresponds to tape movement of 100 microns during the capture time. For a cell size of 4 mm, movements of 10 microns or 100 microns are insignificant. On the other hand, if the capture speed is 100 microseconds per measurement during a tape speed of 10 m/s, that corresponds to tape movement of 1 mm during the capture time. In the latter case, the tape movement during the capture becomes a significant fraction of a given cell width. In one feature of the present embodiment, processor 140 can drive motors 66*a* and 66*b* such that they are free-running, for example, at a maximum rate for moving the flexible tape. In this way, the blocking pattern that is present within exposure region 200 can be determined at any given time. Based on monitoring the servo stripe(s), sensor 20 can be triggered to capture exposure values in a way that is synchronized with the lateral tape movement such that the grid of the blocking pattern on the flexible tape is aligned with widthwise edges 284 of exposure region 200, as seen in FIG. 2*a*, whenever an exposure value is collected. Because the position of tape 100 is known, the exact cellular structure of each blocking pattern is likewise known responsive to lateral movement of the flexible tape. In order to provide such flexibility, lookup table 230 can specify the entire structure of tape 100, in terms of the transmissivity state of each cell, for example, on a column-by-column basis, rather than on a blocking pattern by blocking pattern basis.

While various embodiments described above can utilize a single pair of upper or lower readers, Applicants recognize that the use of four readers proximate to the corners of exposure region 200 can provide certain benefits. As one example, the reader outputs can be averaged in a way that enhances accuracy in determining the lateral position of tape 100. For instance, outputs of upper reader 120a and lower reader 124a can be averaged for purposes of enhancing accuracy in determining the actual lateral position of tape 100. The outputs of upper reader 120b and lower reader 124b can be averaged in a like manner. As another example, given that tape 100 is flexible, there exists the possibility that free portion 106 of the tape can buckle, crease, sag or exhibit slack, among other behaviors. In an embodiment, each reader of the upper readers and/or each reader of the lower readers can be laterally spaced apart such that, under normal conditions, the readers simultaneously detect different servo marks 118. Based on detection of a lack of synchronization between servo mark detections, some sort of adverse condition has taken place. Processor 140, in response, can drive motors 66a and 66b so as to dynamically increase tension on free portion 106 of tape 100. Conversely, once proper synchronization has been restored, processor 140 can reduce the tension via the motors. The foregoing approach of increasing tension represents only one potential response. Applicants recognize that a wide range of other, different approaches can be taken responsive to loss of synchronization. For example, the system can stop, wind all of the tape onto one reel and start over. As another example, the system can slow down the lateral movement of tape 100 and monitor for a recovery in the synchronization. Responsive to recovery, the tape speed can be increased. As still another example, a failure to recover synchronization and/or a sufficiently severe loss of synchronization can cause processor 140 to cease further tape movement and indicate the need for service.

Figure 4:
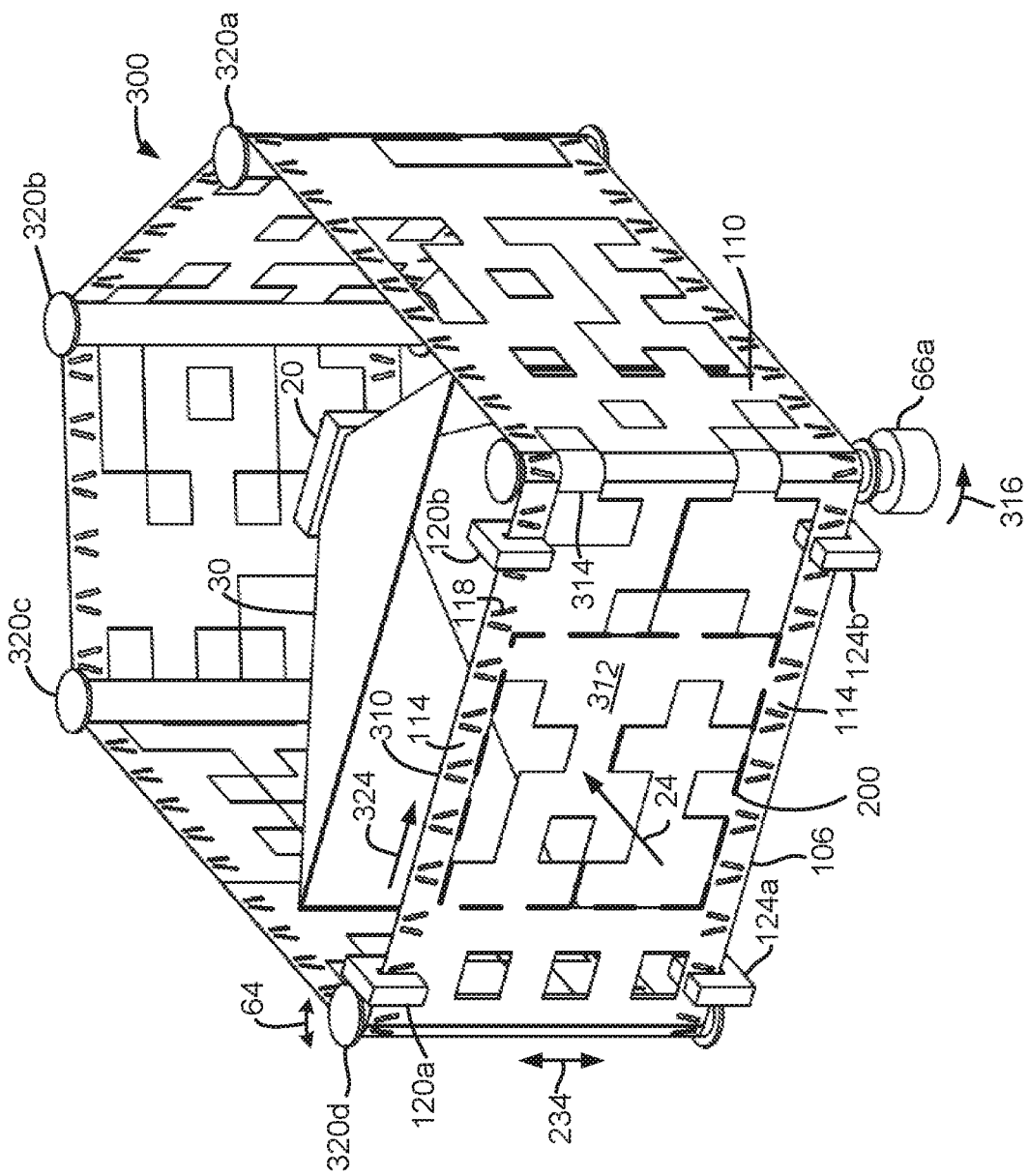
FIG. 4 is a diagrammatic view, in perspective, of another embodiment of a spatial light modulator that can be used in the system of FIG. 1 using a continuous flexible tape loop.
Figure 5:
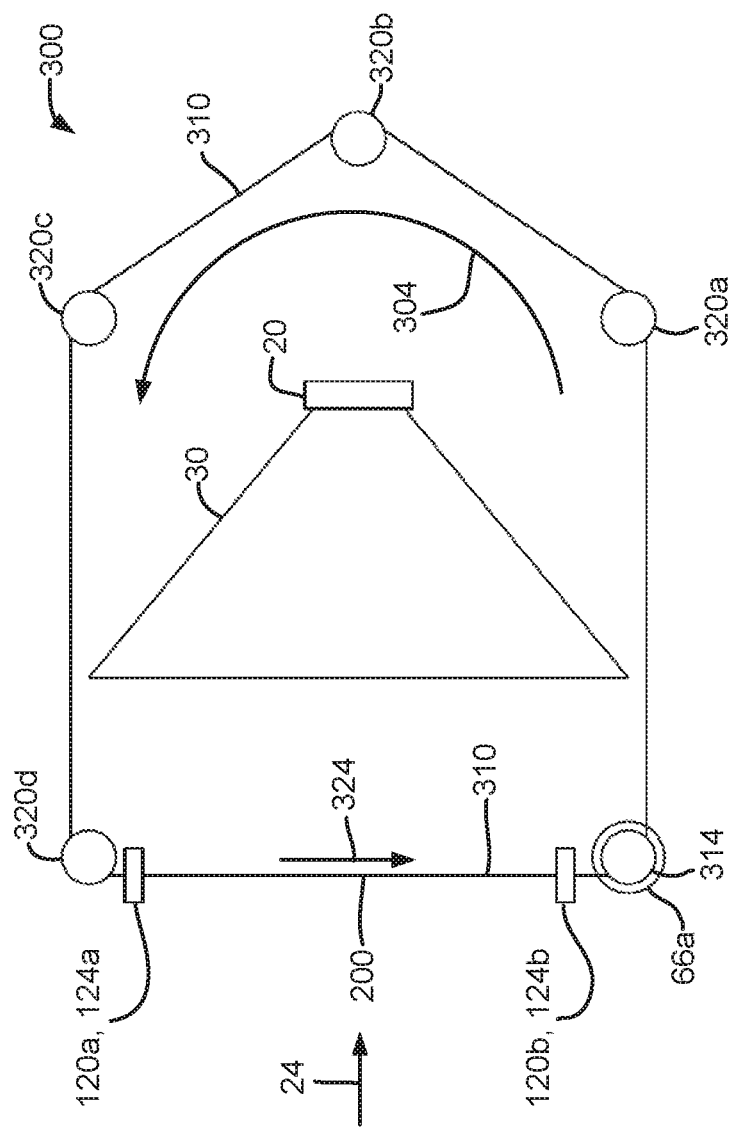
FIG. 5 is a diagrammatic plan view of the spatial light modulator of FIG. 4.

FIG. 4 is a diagrammatic view, in perspective, of another embodiment of a spatial light modulator, generally indicated by the reference number 300, that can be used in system 12 in place of aforedescribed spatial light modulator 10. FIG. 5 is a diagrammatic plan view of spatial light modulator 300. In this embodiment, single pixel sensor 20 and horn 30 are positioned within an interior of a closed loop path 304 (FIG. 5) that is defined by a continuous flexible tape loop 310 that can be produced in accordance with the descriptions above in relation to tape 100 of FIGS. 1 and 2. For this reason, the embodiment of FIG. 4 may be referred to as a continuous flexible tape loop spatial light modulator whereas embodiments according to FIGS. 1 and 2 can be referred to as spooled flexible tape embodiments. It is noted that opaque cells of tape 310 are illustrated as solid white whereas no shading is applied to transmissive cells such that background features are visible in the view of FIG. 4 through the transmissive cells. By way of example, reference number 312 is applied in a region of non-transmissive cells. It is to be understood that lens 34 and scene 28 are positioned on the opposite side of continuous tape 310 with respect to sensor 20 such that millimeter wave radiation 24 is incident on exposure region 200. Electrical interface 150 to processor 140 (FIG. 1) is understood to be present but is not shown for purposes of illustrative clarity. Although not a requirement, given that continuous tape 310 need only move in one direction around loop 304, it should be appreciated that such movement can be accomplished using one motor 66a which selectively rotates a drive reel 314 in a direction that is indicated by an arrow 316. The motor can be a stepper motor in some embodiments and a DC motor in other embodiments, as described above. In the present embodiment, continuous tape 310 is additionally supported by idler spindles or reels 320a-320d which can be supported for bidirectional rotation 64. Like drive reel 314, reels 320a-320d, which may be referred to collectively as idler reels 320, can include any suitable feature(s) that is needed to guide, move and support the continuous tape such as, for example, contours, steps, texturing and/or flanges. Any suitable number of idler reels can be used. For example, in another embodiment, idler reel 320B is not used. In still other embodiments, additional idler reels can be used such that the continuous tape only transits around angles that are greater than 90 degrees. In still another embodiment, one of the idler reels can be supported to serve as a tensioner to resiliently bias against continuous tape 310. Movement by motor 66a laterally/linearly translates continuous tape 310 through exposure region 200 as indicated by an arrow 324 such that free portion 106 is flat or planar. In some embodiments, selected ones of idler reels 320 can apply tension to continuous tape 310 by resisting rotation of its idler reel. Such a tension arrangement, for example, can be friction-based wherein a clutch-like mechanism is disposed between the rotatable reel itself and an associated fixed support shaft. For example, reel 320d can apply tension such that free portion 106 is tensioned and therefore less subject to waviness, buckling and other non-planar or out-of-plane behaviors which would move the tape out of the plane of exposure region 200. It is noted that idler wheels 320, drive reel 314 and motor 66a make up the flexible tape transport in the embodiment of FIG. 4. While the portion of the overall transport path between reel 320d and reel 314 is linear for purposes of passing through exposure region 200, the remainder of the transport path is itself nonlinear, extending in a loop from reel 314 and bending in a non-linear fashion around reels 320a-320d to form a pentagonal shape, although any suitable shape can be used.

Still considering spatial light modulator 300, it should be appreciated that continuous flexible tape 310 does not spool on any of the reels during transport. Thus, an incremental rotational movement of motor 66a should always result in the same amount of movement of continuous tape 310 on the transport path and through exposure region 200. As discussed above with regard to spatial light modulator 10 of FIGS. 1 and 2, continuous tape 310 can be moved from one blocking pattern to the next and held stationary while an exposure value is captured by sensor 20. In other embodiments, it is not necessary for the tape to stop while the exposure value is captured. In some embodiments, motor 66a can operate at a free-running rate in a manner that is consistent with the descriptions above. While the embodiment of FIGS. 1 and 2 provides sweeping benefits over the state-of-the-art wherein the flexible tape is spooled on the reels, a continuous flexible tape loop embodiment provides still further benefits given that there is no need for a reversal of tape movement. Such a reversal includes starting, acceleration, deceleration, stopping, reversal of direction, and so on. In contrast, a continuous loop embodiment subjects the flexible tape to fewer stresses which will lead to comparatively longer tape life. Further, by avoiding the reversal operation, the succession of blocking patterns can continue without a pause. Applicants submit that embodiments utilizing a continuous flexible tape in accordance with FIGS. 4 and 5 can achieve transport rates and imaging rates that can be greater than or at least match those of SLM 10 of FIGS. 1 and 2.

Figure 6:
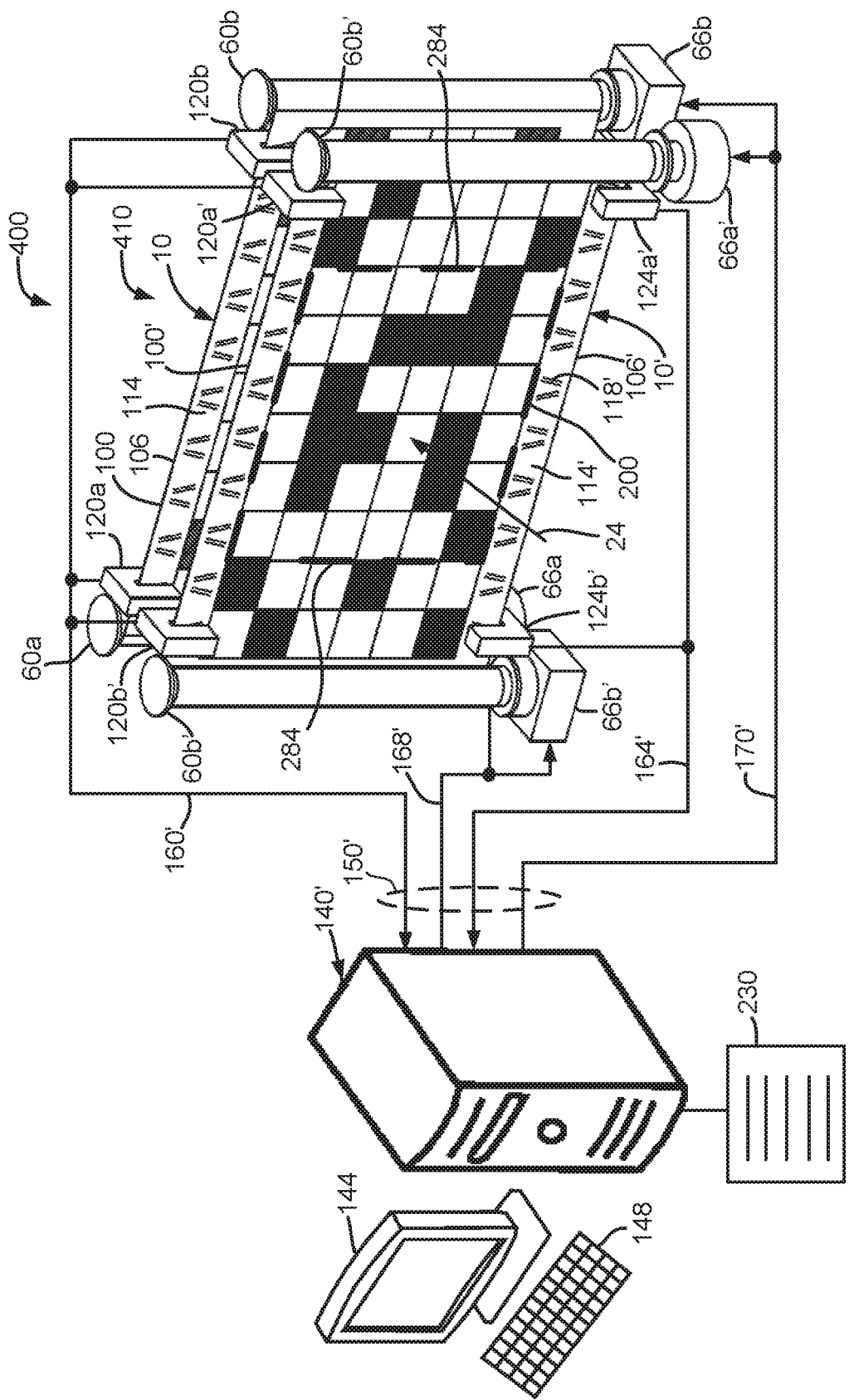
FIG. 6 is a diagrammatic view, in perspective, of still another embodiment of an overall millimeter wave imaging system, produced in accordance with the present disclosure and which uses dual flexible tapes.

FIG. 6 is a diagrammatic view, in perspective, of still another embodiment of an overall millimeter wave imaging system, generally indicated by the reference number 400 and produced in accordance with the present disclosure. It is noted that sensor 20 has not been shown due to illustrative constraints but is understood to be present. In general, system 400 includes a spatial light modulator 410 that is made up of two instantiations (i.e., first and second) of aforedescribed spatial light modulator 10 (see FIG. 2a) with a second instantiation 10' using like reference numbers plus an appended prime (') mark for purposes of clarity. The first and second spatial light modulators operate in a manner that is consistent with the descriptions above. Accordingly, there are two instantiations of the tape transport of FIG. 2a making up the overall tape transport of FIG. 6. In addition, spatial light modulator 10' supports flexible blocking pattern tape 100' such that free portion 106' is at least generally parallel and spaced apart from free portion 106 and flexible blocking pattern tape 100, however, the orientation of spatial light modulator 10' has been reversed by 180 degrees, opposite to that of spatial light modulator 10. Modified interface 150' now includes an interface 160' that receives the outputs of upper readers 120a, 120b, 120a' and 120b' and provides these reader outputs to processor 140'. An interface 164' receives the outputs of lower readers 124a and 124b, which are not visible in the view of the figure due to illustrative constraints, and also receives the outputs of lower readers 124a' and 124b' and provides all of these reader outputs to processor 140'. It is noted that interface 168' provides drive signals to motors 66a and 66b' while interface 170' provides drive signals to motors 66a' and 66b. Exposure region 200 is shown on flexible blocking pattern tape 100', again as a heavy dashed line, with MMW radiation 24 incident thereon such that the incident radiation is subjected to both blocking patterns in series before reaching sensor 20. Stated in another way, the blocking patterns from the first and second tapes are superimposed to cooperatively produce an overall blocking pattern. In this regard, it is noted that the exposed portion of each individual tape may be referred to as a sub-pattern throughout the present disclosure. Thus, the overall, resultant or combined blocking pattern is presented to the incident radiation through the cooperative movement of both flexible tapes. Of course, if either flexible (or both) tape(s) presents a given cell as non-transmissive (i.e., black), the resultant cell in the combined blocking pattern within exposure region 200 will likewise be non-transmissive. Note that the blocking pattern structure along the overall length of each tape can be the same, although this is not a requirement.

Given the use of two flexible blocking pattern tapes, the embodiment of FIG. 6, as well as related embodiments yet to be described, may be referred to as dual tape embodiments. Hence, the embodiment of FIGS. 1 and 2 and the embodiment of FIG. 4 may be referred to as single tape embodiments. The embodiment of FIG. 4 may be referred to more particularly as a continuous single tape embodiment.

Having described the structural details of dual tape system 400, details with respect to its operation will now be provided. The tape transport places the two tapes in a confronting spaced apart relationship, at least in exposure region 200, such that free portions 106 and 106' of the tapes can be at least generally parallel. While region 200 is shown on tape 100', the appearance of this region would appear as unchanged on tape 100 such that the exposure region can be considered to project through both tapes. Accordingly, the incident radiation is subjected to both blocking patterns in series before reaching sensor 20. Thus, an overall or combined blocking pattern is presented to the incident radiation through the cooperative movement of both flexible tapes. During operation, flexible blocking pattern 100' is moved in the opposite (i.e., antiparallel) direction of movement of flexible blocking pattern 100. In this way, the number of cells that change in transmissivity state from a given combined blocking pattern to a successive combined blocking pattern in exposure region 200 is greater for a given movement of each one of the two flexible blocking pattern tapes as compared to moving a single flexible blocking pattern tape the same distance. Stated in another way, the combined blocking pattern can be changed more rapidly for a given rate of tape movement in a dual tape embodiment, as compared to a single tape embodiment using that same given rate of tape movement. As stated above, it is of benefit for there to be a significant change in the blocking pattern from one sensor measurement to the next, such as, for example, at least 20% of the cells switching transmissivity status from one combined blocking pattern to the next. As is also the case with spatial light modulator 10 of FIG. 2a, based on monitoring the servo stripe(s), sensor 20 can be triggered to capture exposure values in a way that is synchronized with the lateral tape movement such that the grids of the blocking patterns on both of the flexible tapes are aligned with widthwise edges 284 of exposure region 200.

Figure 7:
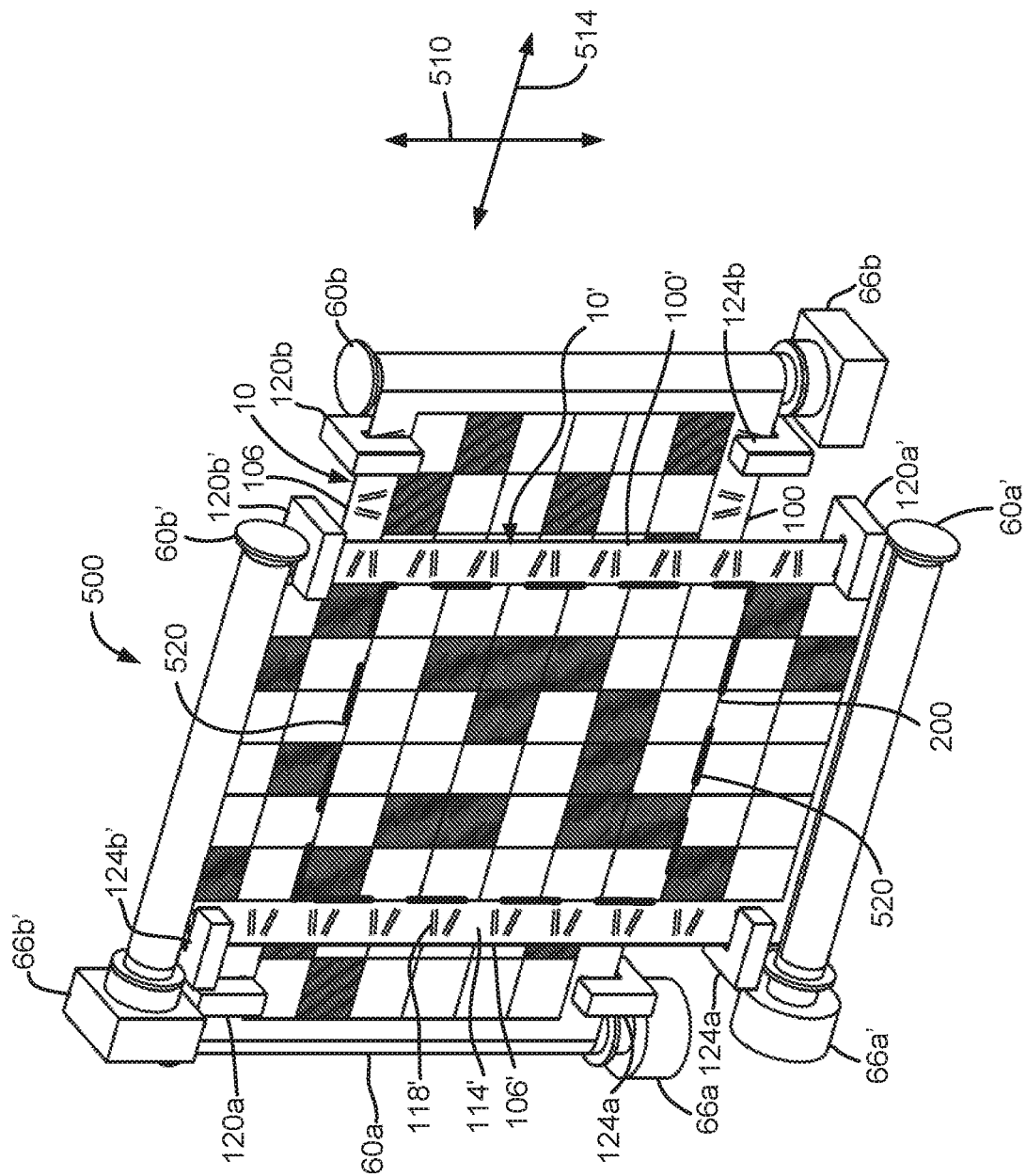
FIG. 7 is a diagrammatic view, in perspective, of yet another embodiment of an overall millimeter wave imaging system, produced in accordance with the present disclosure and which also uses dual flexible tapes.

FIG. 7 is a diagrammatic view, in perspective, of another embodiment of a dual tape spatial light modulator, generally indicated by the reference number 500 and produced in accordance with the present disclosure, that can be used in system 400 of FIG. 6 in place of aforedescribed spatial light modulator 410. It should be appreciated that interface 150' can interface spatial light modulator 500 to processor 140' in a manner that reflects details shown in FIG. 6. Accordingly, sensor 20, processor 140' and interface 150' have not been shown in FIG. 7, but are understood to be present. In general, system 400 includes two instantiations of aforedescribed spatial light modulator 10 (see FIG. 2a) with the second instantiation using like reference numbers plus an appended prime (') mark for purposes of clarity. Again, there are two instantiations of the tape transport of FIG. 2a making up the overall tape transport of FIG. 7. Both of these spatial light modulators operate in a manner that is consistent with the descriptions above with the exception that the directions of movement are transverse to one another with free portions 106 and 106' of the two tapes in a confronting spaced apart relationship, at least in exposure region 200, that can be at least generally parallel. In the present embodiment, the directions of movement are orthogonal (i.e., normal) to one another wherein flexible blocking pattern 100 moves in the directions indicated by an arrow 510 and flexible blocking pattern 100' moves orthogonally in the directions indicated by an arrow 514. In some embodiments, the movement can be transverse as opposed to orthogonal. Spatial light modulator 500 can provide the benefits described above with regard to spatial light modulator 410. Of course, spatial light modulator 500 removes the constraint that the first and second flexible blocking pattern tapes must move in opposite directions. In this regard second flexible tape 100' can move vertically up or down with first flexible tape 100 moving in either lateral direction. As discussed above, based on monitoring the servo stripe(s), sensor 20 can be triggered to capture exposure values in a way that is synchronized with the movement of tapes 100 and 100' such that the grids of the blocking patterns on both of the flexible tapes are aligned both with widthwise edges 284 (FIGS. 2a and 4) and with lengthwise edges 520 of exposure region 200. With regard to the operation of spatial light modulator 500 as well as other embodiments, yet to be described, which employ orthogonal tape movement, Applicants have empirically demonstrated that a tape shift of a single cell vertically and horizontally can produce what is submitted to be a remarkable amount of change in the combined blocking pattern based on the two superimposed patterns, as will be described below in conjunction with subsequent figures.

FIG. 8 is a diagrammatic plan view of another embodiment of a continuous flexible tape loop spatial light modulator, generally indicated by the reference number 600 and produced in accordance with the present disclosure, that can be used in place of spatial light modulator 300 of FIG. 4. For reasons that will become evident, the embodiment of FIG. 8 may be referred to as a flexible dual tape loop or dual counter-rotating loop spatial light modulator. Like spatial light modulator 500 of FIG. 7, interface 150' can electrically interface spatial light modulator 600 to processor 140' in a manner that reflects details shown in FIG. 6, with the exception that the interface need control only one motor per continuous tape loop. Accordingly, sensor 20, processor 140' and interface 150' have not been shown in FIG. 8, but are understood to be present. In general, flexible dual tape loop spatial light modulator 600 includes two (i.e., first and second) instantiations of aforedescribed spatial light modulator 300 (see FIG. 5) with the second instantiation using like reference numbers plus an appended prime (') mark for purposes of clarity. Accordingly, there are two instantiations of the tape transport of FIG. 5 making up the overall tape transport of FIG. 8. First and second spatial light modulators 300 and 300', respectively, operate in a manner that is consistent with the descriptions above such that tape 310 serves as an inner tape loop 304 and tape 310' serves as an outer, counter-rotating tape loop 304' wherein tape 310 moves in a direction 324, indicated by an arrow, and tape 310' moves in an opposite (i.e., antiparallel) direction, indicated by an arrow 324'. At least within exposure region 200, tape 310 and tape 310' are at least generally in a parallel confronting and spaced apart relationship such that one major surface of one of the flexible tapes confronts another major surface of the other one of the flexible tapes. In some embodiments, tapes 310 and 310' can move in the same direction, which necessitates moving the two tapes at different rates.

FIG. 9 is a diagrammatic view, in perspective, of still another embodiment of a dual continuous flexible tape loop spatial light modulator, generally indicated by the reference number 700 and produced in accordance with the present disclosure Like embodiment 600 of FIG. 8, embodiment 700 uses two instantiations of spatial light modulator 300 of FIG. 4 such that a first tape 310 rotates around a first transport path defining a horizontal plane while a second tape 310' rotates around a second transport path to define a vertical plane. In FIG. 9, it is noted that the terms vertically and horizontally are used by way of describing the relationship between the two tapes and introduce no limitation insofar as the operational orientation of the overall spatial light modulator. Further, the drawing is simplified to represent only a continuous centerline of each of tapes 310 and 310'. In comparison with FIG. 8, spatial light modulator 300' has been rotated by an angle β which can be at least approximately 90 degrees. Accordingly, tapes 310 and 310' cooperatively define exposure region 200 which is shown as a dashed rectangle with tape 310 moving in a direction 704, indicated by an arrow, defining a horizontal loop 706 and tape 310' moving in an at least generally orthogonal loop 708, indicated by another arrow. It is noted that either or both of these directions can be reversed such that the illustrated directions are by way of example and are not required. Moreover, there is no requirement for tape 310 to serve as an inner loop, in the manner shown, with respect to tape 310'. It is noted that spatial light modulator 700 provides at least the benefits described above with regard to spatial light modulator 600 of FIG. 8.

In view of the foregoing, it should be appreciated that one of ordinary skill in the art can configure additional embodiments based on the embodiments described above. For example, one additional embodiment can utilize a spooled flexible tape in combination with a continuous flexible tape loop. In this regard, either tape loop in FIGS. 8 and 9 can be replaced by a spooled flexible tape.

FIG. 10 is a diagrammatic view, in perspective, of still another embodiment of a spatial light modulator, generally indicated by the reference number 800, that can be used in system 12 of FIGS. 1 and 2 in place of aforedescribed spatial light modulator 10. In this embodiment a linear stage 810 supports a first rigid blocking pattern structure 814 and a second rigid blocking pattern structure 818 for selective/ independent movement along a direction indicated by a double-headed arrow 820. The rigid blocking pattern structures can be of any suitable length and formed from any suitable material. Transmissive cells can be formed by voids or by removing a material layer if the material layer forming the blocking pattern structure is opaque at the wavelength of interest while a supporting substrate is transmissive. In millimeter or terahertz wave embodiments, for example, the blocking pattern structures can be a solid aluminum sheet material with holes milled or etched through to form transmissive cells. On the other hand, if the blocking pattern structure material or substrate is transmissive in the wavelength of interest, then the opaque cells can be formed by adding a material layer that is opaque at the wavelength of interest where non-transmissive cells are desired. In millimeter wave, for example, this embodiment can be a circuit board (transmissive in millimeter wave) with copper (opaque in millimeter wave) squares deposited or otherwise defined thereon. Exposure region 200 is shown on first rigid blocking pattern structure 814, again as a heavy dashed line, with MMW radiation 24 incident thereon such that the incident radiation is subjected to both blocking patterns in series before reaching sensor 20. Thus, an overall or combined blocking pattern is presented to the incident radiation through the cooperative movement of both flexible tapes. Each one of blocking pattern structures can be moved bidirectionally by a suitable motor, such as, for example, a stepper motor. In the present embodiment, first and second motors 824 and 828 are diagrammatically shown in phantom using dashed lines. An output shaft of each motor engages an associated one of the rigid blocking pattern structures in any suitable matter. As one example, each motor output shaft can support a rubber roller that engages a lengthwise edge margin of each rigid blocking pattern structure. As another example, each motor output shaft can support a gear having teeth that engage a complementary pattern defined along the lengthwise edge margin of each rigid blocking pattern structure. Processor 140 of FIGS. 1 and 2 can be adapted to drive motors 824 and 828 using modified interfaces 168' and 170'. It is noted that any suitable arrangement such as, for example, rollers can be used to support the rigid blocking pattern structures for smooth lateral movement. In some embodiments, a servo pattern can be employed along the lengthwise edge(s) of the rigid blocking pattern structures with associated readers.

Having described spatial light modulator 800 in detail, it is appropriate to note that the use of dual rigid blocking pattern structures provides for changing the transmissivity state of a greater number of cells in a combined blocking pattern within exposure region 200 for a given movement of each one of the two rigid blocking pattern structures as compared to moving a single rigid blocking pattern structure the same distance.

In view of the foregoing, Applicants further recognize that one or both of the first and second rigid blocking pattern structures can be extended in the vertical direction shown in the figures such that one or both of the blocking pattern structures can be moved in two dimensions wherein the vertical direction is indicated by a double-headed arrow 840 in FIG. 10. In another embodiment, blocking pattern structure 814 can be moved horizontally, as shown in the direction of arrow 820, while blocking pattern structure 818 is moved vertically in the direction of arrow 840.

As seen in FIGS. 1, 2, 4, 6 and 7, servo marks 118 are used having a chevron pattern for each mark that is made up of a pair of transmissive bands at least generally in a V-shape or an inverted V-shape. The bands can be formed as voids by removing the entire material thickness or by only removing material in the cells that is opaque at the wavelength of interest, for example, by etching, molding, or milling.

Figure 11:
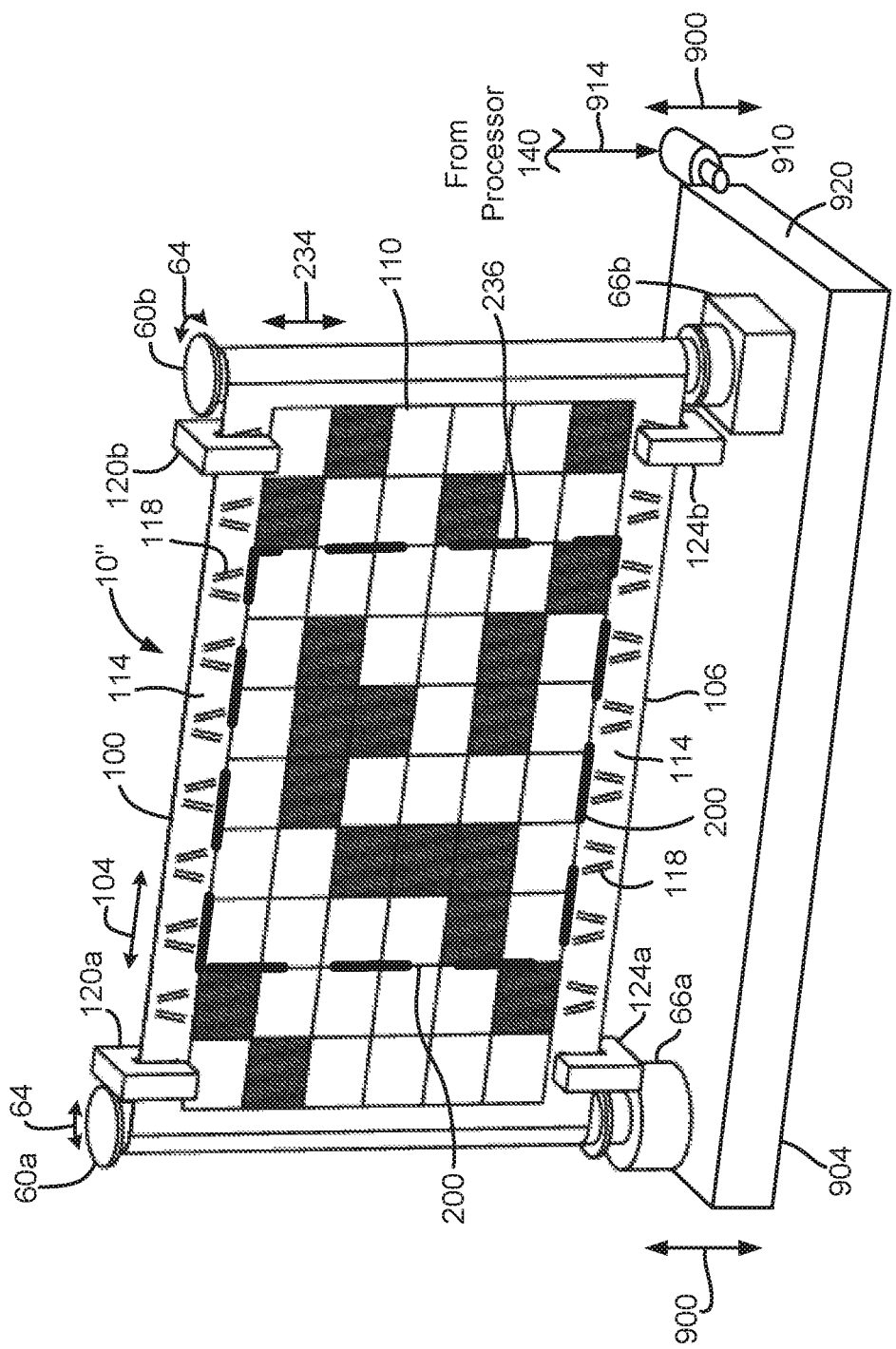
FIG. 11 is a diagrammatic view, in perspective, illustrating a modified embodiment of a spatial light modulator, which is based on the spatial light modulator shown in FIGS. 1 and 2a in accordance with the present disclosure.

FIG. 11 is a diagrammatic view, in perspective, illustrating a modified embodiment of a spatial light modulator, generally indicated by the reference number 10″, which is based on spatial light modulator 10 of FIGS. 1 and 2. In spatial light modulator 10″, motors 66a and 66b and their associated reels are supported for linear vertical movement in the direction indicated by double-headed arrows 900, for example, by a linear stage 904 such that the linear stage can move tape 100 vertically independent of readers 120 and 124 to compensate for vertical/transverse fluctuations of the tape orthogonal to direction 104 so as to maintain exposure region 200 vertically centered on the blocking pattern between the servo stripes. Stated in another way, linear stage 904 can be used to vertically center each servo stripe on its associated readers 120 and/or 124 as the servo stripe moves laterally/horizontally such that the servo stripe(s) is tracked by the readers. It should be appreciated that interface 150 can connect to processor 140, as shown in FIGS. 1 and 2, with the further addition of a motor 910 for driving linear stage 904 via an interface 914 from processor 140. The processor can receive the outputs from readers 120 and 124, or some suitable combination of these readers, as feedback to generate a motor drive signal on interface 914. While any suitable embodiment of a linear stage and associated motor or motors can be used, FIG. 11 illustrates an output shaft of motor 910 engaging a sidewall of linear stage 904. For purposes of this engagement, the output shaft can support a rubber sleeve or roller biased against sidewall 920, or the output shaft can support a toothed gear which engages a complementary pattern formed in sidewall 920. Motor 910 can be of any suitable type such as, for example, a stepper motor. Gearing can be used between the motor output shaft and the linear stage, if desired. In view of these teachings, in another embodiment, a linear stage 904′ and associated motor can be used in FIG. 1 to move sensor 20 vertically in a direction indicated by a double-headed arrow. While the motor is not shown in FIG. 1 due to illustrative constraints, it should be appreciated that the same drive signals used to drive linear stage 904 of FIG. 11 can be utilized such that the sensor moves vertically in a way that causes exposure region 200 to move vertically, in a like manner, such that the exposure region tracks vertical movements/deflections of the blocking pattern on the flexible tape. In a similar manner, an additional linear stage can support linear stage 904 for movement in direction 104 that is aligned with the length of the flexible tape in exposure region 200 to compensate for lateral misalignment between the cell pattern/grid of the flexible tape and the vertical edges or bounds of the exposure region. That is, such compensation can maintain alignment of the cell grid with the vertical edges of exposure region 200. It should be understood that the teachings brought to light herein with regard to compensation for vertical or transverse deflection/movement of a flexible blocking pattern tape are applicable to any embodiment that employs one or more flexible blocking pattern tapes.

As noted above, the servo marks can be of any suitable shape and are not limited to chevrons. In one embodiment, each servo mark can be a single vertical transmissive band or slot. This embodiment facilitates detection of lengthwise motion of a flexible tape blocking pattern structure, for example, when detection of tape motion vertically in the plane of exposure region 200 is not necessary. Conversely, tape motion vertically in the plane of exposure region 200 can be monitored by defining one or more horizontally oriented transmissive bands. As will be discussed immediately hereinafter, some embodiments can utilize both vertical and horizontal bands.

Attention is now directed to FIG. 12 which is a diagrammatic fragmentary illustration, in elevation, of a portion of a blocking pattern structure, generally indicated by the reference number 1000, which includes an overall blocking pattern 1002 formed on a flexible tape 1004 as well as a first servo stripe 1006 made up of three horizontal bands, although any suitable number of one or more bands can be used, and a second servo stripe 1008 that is made up of vertical bands. It is noted that one of these servo stripes can be positioned along the lower lengthwise edge margin of the flexible tape. A first pair of readers 1010a and 1010b monitors first stripe 1006 while a second pair of readers 1014a and 1014b monitors second stripe 1008. Thus, the first pair of readers provide outputs responsive to lateral/horizontal or lengthwise movement of tape 1004 while the second pair of readers provide outputs responsive to transverse/vertical movement of tape 100. In some embodiments, an absolute position code 1030 can periodically be inserted, for example, between adjacent servo marks on one or more servo stripes. A second instance of an absolute position code is indicated by the reference number 1034 and is readable by readers 1014a and 1014b. In the present example, the absolute position code is a bar code which can identify an actual position of that particular code along the entire length of the flexible tape. It is noted that absolute position codes are also shown in FIG. 2a, indicated by the reference numbers 1040 in both the upper and lower servo stripes, although this is not a requirement. In the present embodiment, the absolute position codes are bar codes, although any suitable form of code can be utilized. In an embodiment, one of the upper and lower servo stripes can be dedicated exclusively to absolute position codes while the other one of the upper and lower servo stripes is dedicated to servo marks such as, for example, the chevron shaped marks of FIGS. 1 and 2a. In still another embodiment, absolute position marks/codes can also serve in place of servo marks. For example, in FIG. 2a, servo marks 118 can be replaced by absolute position bar codes 1040.

Figure 13:
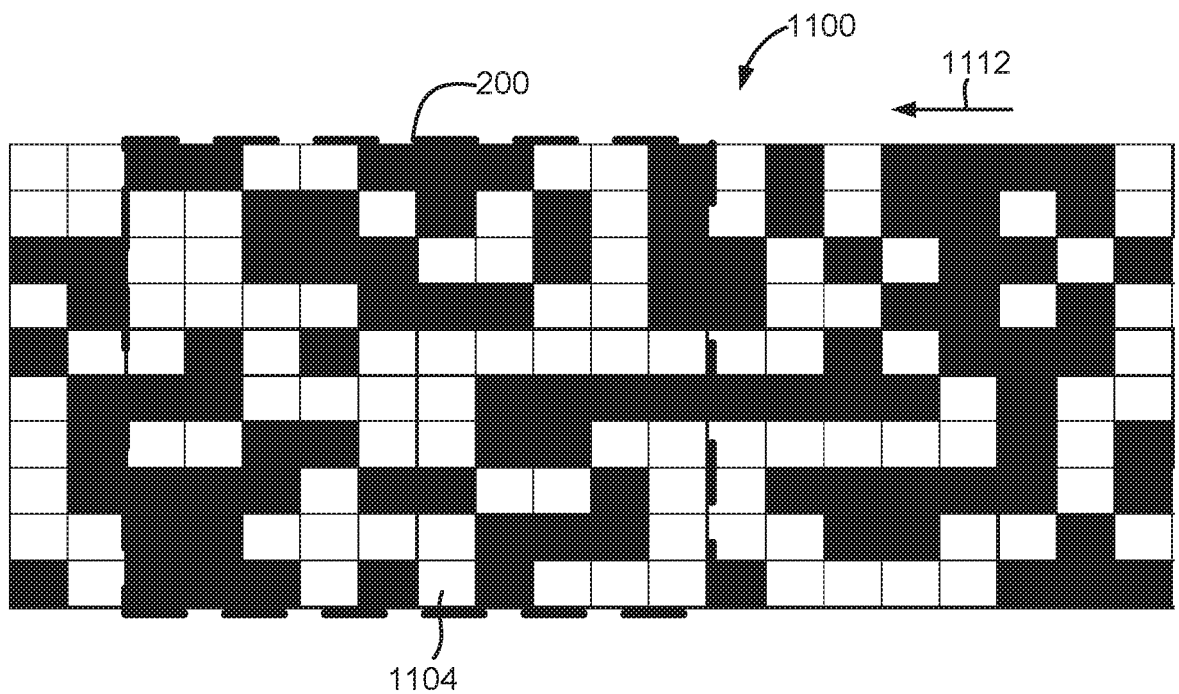
FIG. 13 is a diagrammatic fragmentary illustration, in elevation, of a portion of a blocking pattern structure, illustrating an initial blocking pattern in the exposure region.
Figure 14:
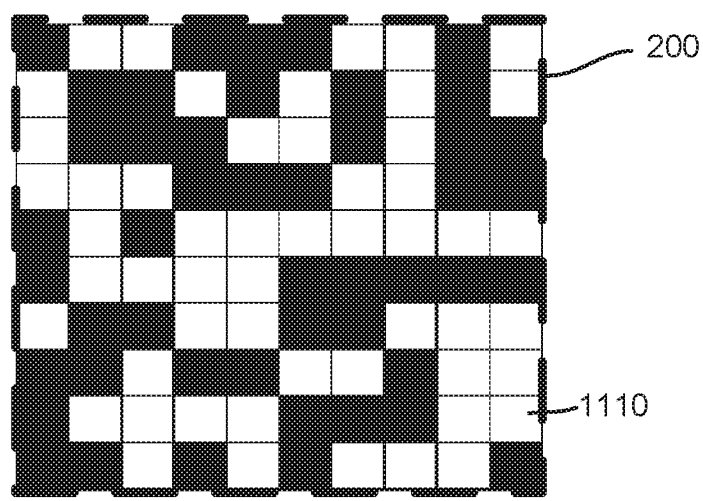
FIG. 14 is a diagrammatic fragmentary illustration, in elevation, of the portion of the blocking pattern structure of FIG. 13, illustrating a resultant blocking pattern in the exposure region, responsive to moving the blocking pattern structure by one cell width.

Attention is now directed to FIG. 13 which diagrammatically illustrates at least a portion of a blocking pattern structure, generally indicated by the reference number 1100. Blocking pattern structure 1100, for example, can form a portion of a single flexible tape embodiment in accordance with the descriptions above. It is noted that servo stripes have not been illustrated but can nevertheless be present. Exposure region 200 is shown as a heavy dashed line with an initial blocking pattern 1104 disposed therein that is made up of a 10×10 array of cells. FIG. 14 illustrates exposure region 200 framing a resultant blocking pattern 1110, based on moving blocking pattern structure 1100 one cell to the left in the direction indicated by an arrow 1112 in FIG. 13. It is noted that exposure region 200 is vertically aligned between FIGS. 13 and 14.

Figure 15:
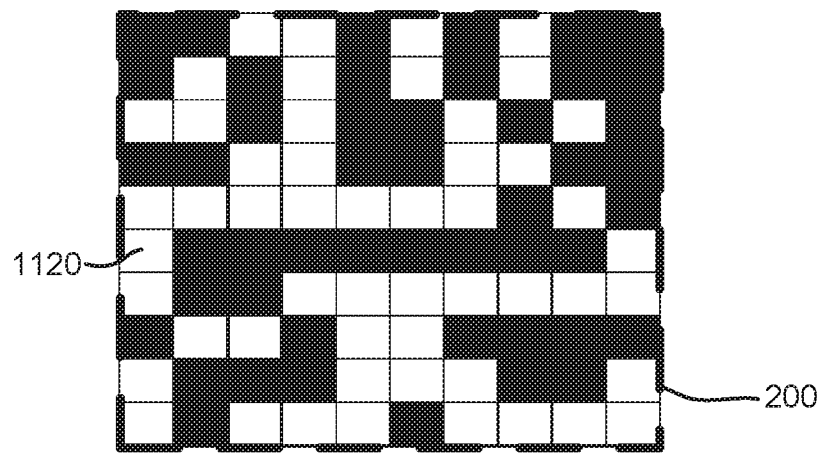
FIG. 15 is a diagrammatic fragmentary illustration, in elevation, of the portion of the blocking pattern structure of FIG. 13, illustrating a resultant blocking pattern in the exposure region, responsive to moving the blocking pattern structure by five cell widths.

FIG. 15 illustrates exposure region 200 framing a resultant blocking pattern 1120, based on moving initial blocking pattern structure 1104 of FIG. 13 five cells to the left in the direction indicated by arrow 1112.

Figure 16:
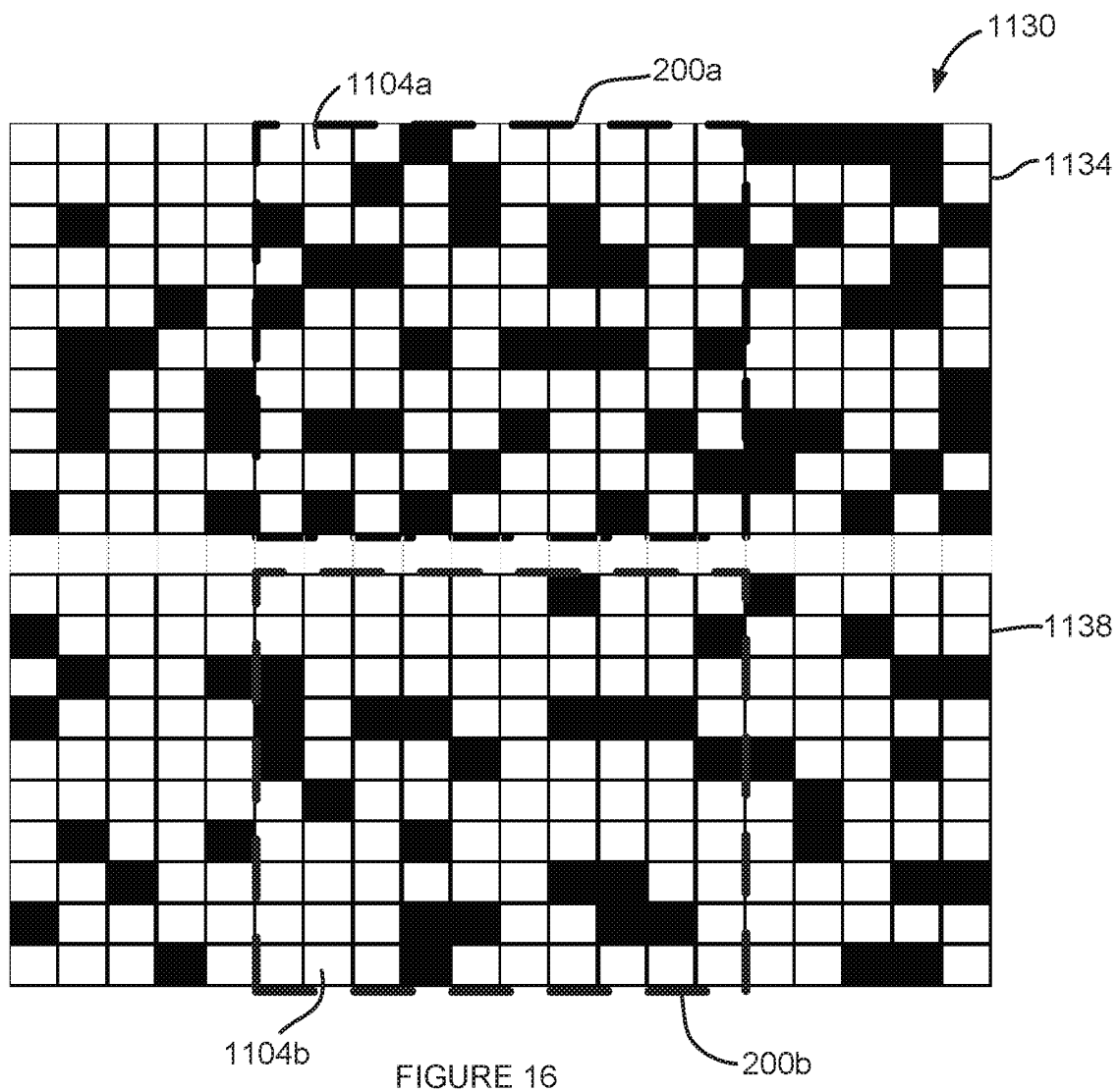
FIG. 16 diagrammatically illustrates, in an elevational and fragmentary view, a spatial light modulator including first and second blocking pattern structures, in accordance with the present disclosure.

FIG. 16 diagrammatically illustrates a spatial light modulator, generally indicated by the reference number 1130, which includes a first blocking pattern structure 1134 (partially shown) and a second blocking pattern structure 1138 (partially shown) each of which, for example, can form a portion of first and second flexible tapes, respectively, such as in FIGS. 6 and 8 or a portion of first and second rigid blocking pattern structures such as shown in FIG. 10. Due to illustrative constraints, the two blocking sub-pattern structures are shown in a spaced apart vertical alignment with exposure regions 200a and 200b shown using heavy dashed lines, however, it is to be understood that the blocking sub-patterns present in exposure regions 200a and 200b are positioned in series to superimpose and cooperatively form a combined or overall resultant blocking pattern within exposure region 200, in a manner that is consistent with the descriptions above. In embodiments that use flexible tape, one or more servo stripes can be used on each flexible tape. Irrespective of whether dual flexible tapes or rigid blocking pattern substrates are used, relative movement is generally antiparallel (i.e., opposite). It is noted that antiparallel dual tape embodiments are shown in FIGS. 6 and 8 whereas an antiparallel rigid blocking pattern structure is shown in FIG. 10. Servo stripes have not been illustrated but can nevertheless be present. Exposure regions 200a and 200b frame initial blocking sub-patterns 1104a and 1104b each of which is made up of a 10×10 array of cells.

Figure 17:
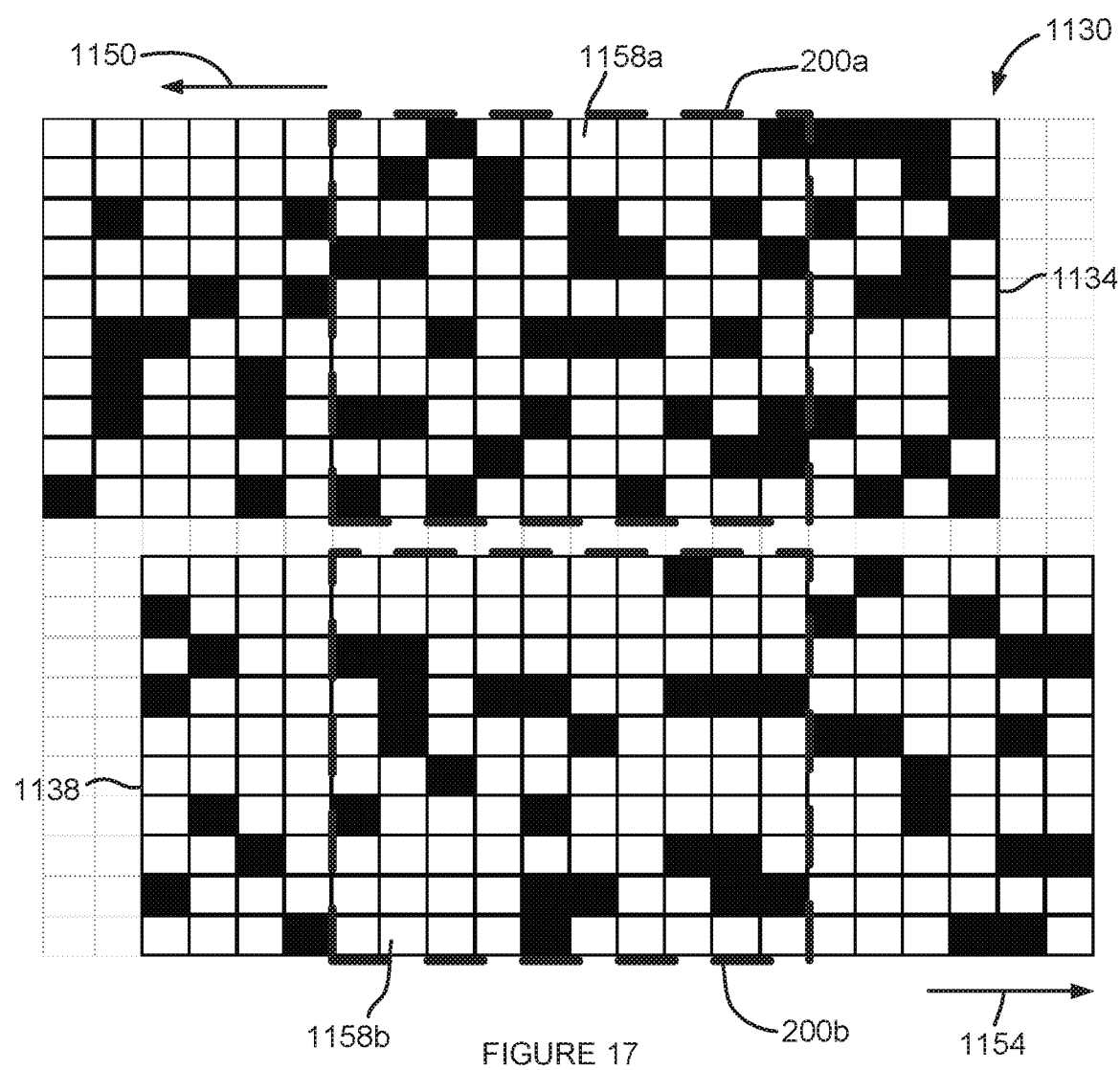
FIG. 17 is a diagrammatic illustration, in an elevational and fragmentary view, of the spatial light modulator of FIG. 16, but with each of the first and second blocking patterns moved in opposing directions by one cell width.

FIG. 17 illustrates spatial light modulator 1130 with blocking pattern structure 1134 moved by one cell width in a first direction 1150, indicated by an arrow, and blocking pattern structure 1138 moved by one cell width in a second, opposite direction 1154, indicated by another arrow. Accordingly, exposure regions 200a and 200b frame shifted blocking sub-patterns 1158a and 1158b.

Figure 18:
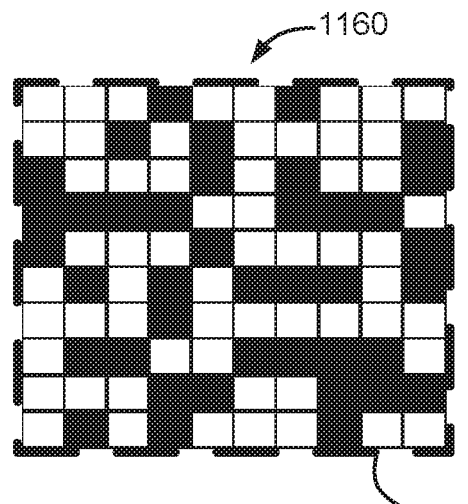
FIG. 18 illustrates a diagrammatic fragmentary view, in elevation, of the exposure region with a resultant superimposed initial blocking pattern based on FIG. 16.
Figure 19:
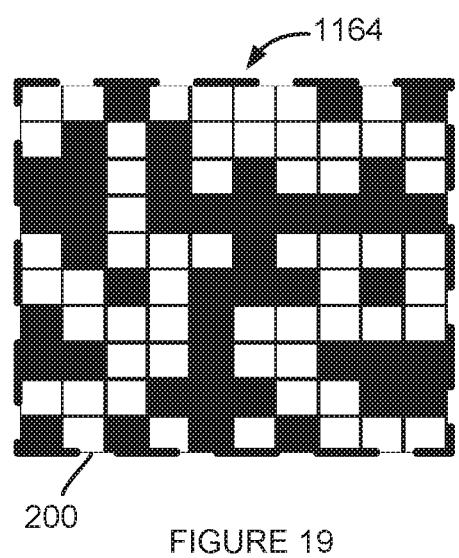
FIG. 19 illustrates a diagrammatic fragmentary view, in elevation, of the exposure region with a resultant superimposed shifted blocking pattern based on FIG. 17 for side-by-side comparison with the superimposed initial blocking pattern of FIG. 18.

FIG. 18 illustrates a resultant superimposed initial blocking pattern in exposure region 200, generally indicated by the reference number 1160, based on FIG. 16 while FIG. 19 illustrates a resultant superimposed shifted blocking pattern, generally indicated by the reference number 1164, based on FIG. 17.

Figure 20:
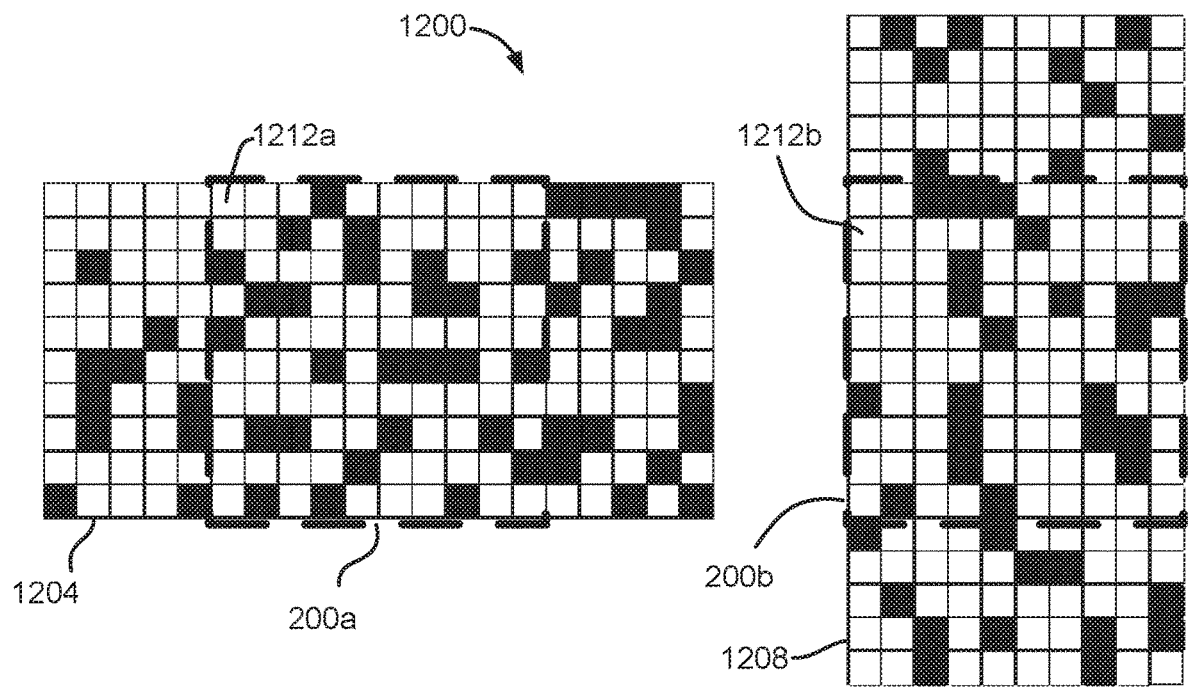
FIG. 20 diagrammatically illustrates, in an elevational and fragmentary view, a spatial light modulator including first and second blocking pattern structures, in accordance with the present disclosure.

FIG. 20 diagrammatically illustrates a spatial light modulator, generally indicated by the reference number 1200, which includes a first blocking pattern structure 1204 (partially shown) and a second blocking pattern structure 1208 (partially shown) each of which, for example, can form a portion of first and second flexible tapes, respectively, such as in FIGS. 7 and 9. Due to illustrative constraints, the two blocking sub-pattern structures are shown in a spaced apart horizontal alignment with exposure regions 200a and 200b shown using heavy dashed lines, however, it is to be understood that the blocking sub-patterns present in exposure regions 200a and 200b are positioned in series to superimpose and cooperatively form a combined or overall resultant blocking pattern within exposure region 200, in a manner that is consistent with the descriptions above. In embodiments that use flexible tape, one or more servo stripes can be used on each flexible tape. Irrespective of whether dual flexible tapes or rigid blocking pattern substrates are used, relative movement is generally transverse or orthogonal (i.e., normal). Exposure regions 200a and 200b frame initial blocking sub-patterns 1212a and 1212b, each of which is made up of a 10×10 array of cells.

Figure 21:
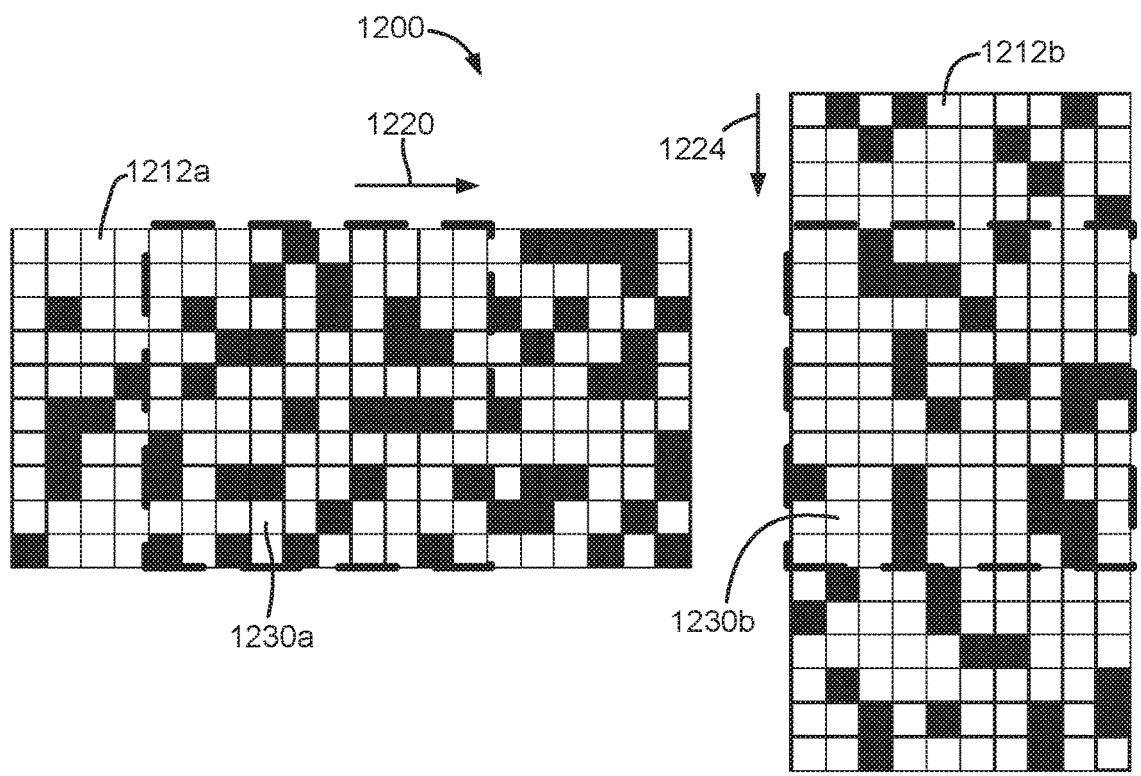
FIG. 21 is a diagrammatic illustration, in an elevational and fragmentary view, of the spatial light modulator of FIG. 20, but with each of the first and second blocking patterns moved in opposing directions by one cell width.

FIG. 21 illustrates spatial light modulator 1200 with blocking pattern structure 1204 moved by one cell width to the right in a direction 1220, indicated by an arrow, and blocking pattern structure 1208 moved by one cell down in a direction 1224, indicated by another arrow. Accordingly, exposure regions 200a and 200b frame shifted blocking sub-patterns 1230a and 1230b.

Figure 22:
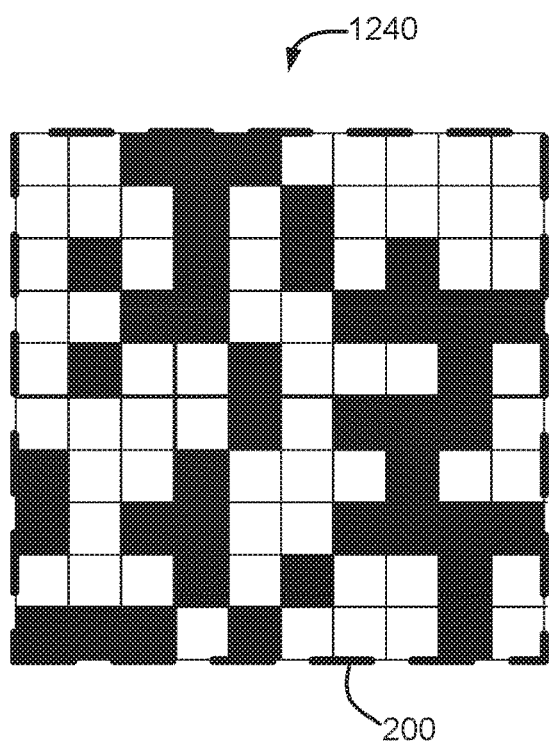
FIG. 22 illustrates a diagrammatic fragmentary view, in elevation, of the exposure region with a resultant superimposed initial blocking pattern based on FIG. 20.
Figure 23:
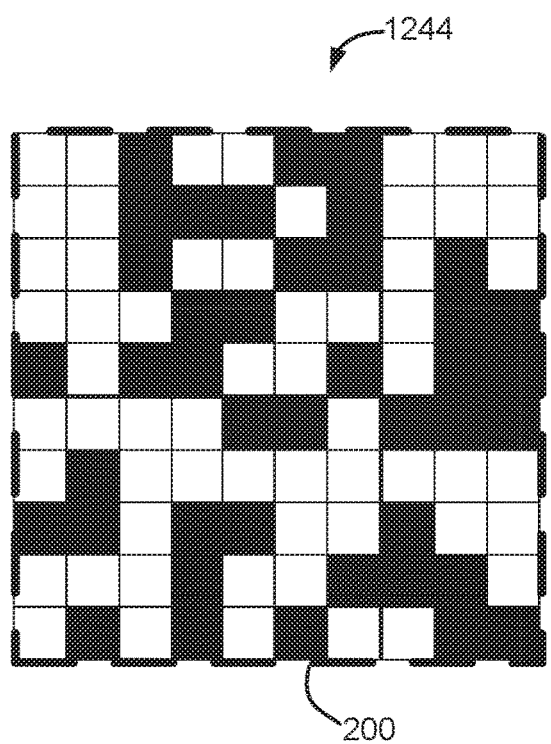
FIG. 23 illustrates a diagrammatic fragmentary view, in elevation, of the exposure region with a resultant superimposed shifted blocking pattern based on FIG. 21 for side-by-side comparison with the superimposed initial blocking pattern of FIG. 22.

FIG. 22 illustrates a resultant superimposed initial blocking pattern in exposure region 200, generally indicated by the reference number 1240, based on FIG. 20 while FIG. 23 illustrates a resultant superimposed shifted blocking pattern, generally indicated by the reference number 1244, based on FIG. 21.

The foregoing description of the invention has been presented for purposes of illustration and description. It is not intended to be exhaustive or to limit the invention to the precise form or forms disclosed, and other modifications and variations may be possible in light of the above teachings. Accordingly, those of skill in the art will recognize certain modifications, permutations, additions and sub-combinations of the embodiments described above.

What is claimed is:

1. A system for passive imaging of a scene, said system comprising:
   a single pixel sensor;
   an antenna for collecting electromagnetic energy from the scene and directing the electromagnetic energy toward the single pixel sensor;
   at least a first flexible tape supporting a first series of blocking patterns along a first lengthwise dimension of the first flexible tape;
   a tape transport supporting the first flexible tape for movement to transit the first flexible tape linearly through the electromagnetic energy in an exposure region as the electromagnetic energy is traveling from the antenna to the single pixel sensor and the first flexible tape moves on a first tape transport path that is, at least in part, nonlinear outside of the exposure region; and
   a processor configured for capturing a set of output values from the single pixel sensor such that each output value is responsive to one of the blocking patterns of the first series of blocking patterns and for forming an image of the scene based on the set of output values associated with the first series of blocking patterns.

2. The system of claim 1 wherein the single pixel sensor is a single pixel millimeter wave sensor and the arrangement for collecting electromagnetic energy comprises an antenna for collecting millimeter wave electromagnetic energy from the scene.

3. The system of claim 1 wherein said flexible tape includes opposing first and second flexible tape ends and said tape transport includes a first spool and a second spool with the first spool receiving the first flexible tape end and the second spool receiving the second flexible tape end, said first and second spools supported for selective rotation of the series of blocking patterns between the first spool and the second spool to move the flexible tape along the lengthwise dimension to move the blocking patterns through the electromagnetic energy in the exposure region.

4. The system of claim 3 wherein the tape transport is configured to step the series of blocking patterns in a first direction through the electromagnetic energy and, thereafter, to step the series of blocking patterns through the electromagnetic energy in a second, reverse direction.

5. The system of claim 1 wherein the flexible tape forms a continuous loop and the tape transport supports the flexible tape for lengthwise movement along a tape transport path that forms a closed loop path.

6. The system of claim 5 wherein the tape transport is configured to move the first flexible tape in only one direction around the closed loop path.

7. The system of claim 1, further comprising:
a second flexible tape supporting a second series of blocking patterns along a second lengthwise dimension of the second flexible tape;
said tape transport supports the second flexible tape to transit the second flexible tape linearly through the electromagnetic energy in the exposure region and the second flexible tape moves on a second tape transport path that is, at least in part, nonlinear outside of the exposure region;
said processor for receiving said set of outputs from the single pixel sensor with each output value (i) responsive to one of the blocking patterns of the first series of blocking patterns and (ii) responsive to another one of the blocking patterns of the second series of blocking patterns such that the received electromagnetic energy of the scene is based on the first and second series of blocking patterns.

8. The system of claim 7 wherein each of the first flexible tape and the second flexible tape includes a pair of opposing major sides and the tape transport supports the first flexible tape and the second flexible tape such that one major side of the first flexible tape is in a confronting spaced apart relationship with another major side of the second flexible tape at least in the exposure region.

9. The system of claim 8 wherein the first flexible tape is parallel to the second flexible tape at least in the exposure region.

10. The system of claim 7 wherein the first tape transport path moves the first flexible tape through the electromagnetic energy in a direction that is opposite to movement of the second flexible tape along the second tape transport path through the electromagnetic energy.

11. The system of claim 7 wherein the second tape transport path moves the second flexible tape through the electromagnetic energy in a direction that is transverse to movement of the first flexible tape along the first tape transport path through the electromagnetic energy.

12. The system of claim 7 wherein the second tape transport path moves the second flexible tape through the electromagnetic energy in a direction that is normal to movement of the first flexible tape along the first tape transport path through the electromagnetic energy.

13. The system of claim 1 wherein the flexible tape includes a widthwise dimension and the first flexible tape carries a servo pattern in addition to the first series of blocking patterns and said tape transport includes a servo pattern detector that produces a servo pattern output that is indicative of irregular movement of the first flexible tape along at least one of said widthwise dimension and said lengthwise dimension.

14. The system of claim 13 wherein the servo pattern is defined along at least one lengthwise edge margin of the first flexible tape.

15. The system of claim 14 wherein the servo pattern is a chevron pattern.

16. The system of claim 13 wherein the tape transport includes a servo for moving the first flexible tape in at least one of the widthwise dimension and the lengthwise dimension responsive to the servo pattern output to compensate for the irregular movement.

17. The system of claim 13 further comprising:
a servo for moving the single pixel sensor at least generally in alignment with at least one of the widthwise dimension and the lengthwise dimension responsive to the servo pattern output to compensate for the irregular movement.

18. The system of claim 1 wherein the tape transport steps the first series of blocking patterns through the electromagnetic energy such that each blocking pattern is momentarily stationary in the electromagnetic energy.

19. The system of claim 18 wherein the processor reads each output of the set of output values when a corresponding one of the first series of blocking patterns is momentarily stationary.

20. The system of claim 1 wherein the tape transport moves the first series of blocking patterns continuously through the electromagnetic energy such that each blocking pattern passes through the electromagnetic energy in a transit time and said processor captures each output of the set of outputs from the single pixel sensor while the first flexible tape is moving in a capture time period that is less than $1/10^{th}$ of the blocking pattern transit time.

21. The system of claim 1 wherein the processor captures each value of the set of values responsive to one of the blocking patterns received in an aligned position within the electromagnetic energy.

22. The system of claim 1 wherein said tape transport moves the first series of blocking patterns at a free-running maximum rate.

23. The system of claim 22 wherein said processor captures the set of values at a maximum capture rate that is determined by said single pixel sensor.

24. The system of claim 1 wherein the single pixel sensor is a single pixel millimeter wave sensor and the antenna is configure to collect millimeter wave electromagnetic energy from the scene.

25. A method for passive imaging of a scene, said method comprising:
collecting electromagnetic energy from the scene;
directing the electromagnetic energy toward a single pixel sensor;
supporting at least a first flexible tape having a first series of blocking patterns along a first lengthwise dimension of the first flexible tape for movement to transit the first flexible tape linearly through the electromagnetic energy in an exposure region as the electromagnetic energy is traveling from the antenna to the single pixel sensor;
moving the first flexible tape on a first tape transport path that is, at least in part, nonlinear outside of the exposure region; and
capturing a set of output values from the single pixel sensor such that each output value is responsive to one of the blocking patterns of the first series of blocking patterns and for forming an image of the scene based on the set of output values associated with the first series of blocking patterns.

26. A spatial light modulator in a system for passive imaging of a scene, which system includes a single pixel sensor, an arrangement for collecting electromagnetic energy from the scene and directing the electromagnetic energy toward the single pixel sensor, and a processor for capturing a set of output values from the single pixel sensor such that each output value is responsive to one blocking pattern of a series of blocking patterns, said spatial light modulator comprising:
  at least one flexible tape supporting the first series of blocking patterns along a first lengthwise dimension of the flexible tape; and
  a tape transport supporting the flexible tape for movement to transit the flexible tape with the series of blocking patterns linearly through the electromagnetic energy in an exposure region as the electromagnetic energy is traveling from the collecting arrangement to the single pixel sensor and the flexible tape moves on a tape transport path that is, at least in part, nonlinear outside of the exposure region.

27. The spatial light modulator of claim 26 wherein the single pixel sensor is a single pixel millimeter wave pixel and the electromagnetic collection arrangement comprises an antenna for collecting millimeter wave electromagnetic energy from the scene.

28. A system for passive imaging of a scene, said system comprising:
  a single pixel sensor;
  an antenna for collecting electromagnetic energy from the scene and directing the electromagnetic energy toward the single pixel sensor;
  a first blocking pattern structure and a second blocking pattern structure arranged in a spaced apart, series relationship in a path along which the electromagnetic energy travels from the antenna to the single pixel sensor such that no more than a first portion of the first blocking pattern structure and no more than a second portion of the second blocking pattern structure are exposed to the electromagnetic energy in the path;
  a transport for moving the first blocking pattern structure and the second blocking pattern structure relative to one another, transverse to said path, responsive to a first drive signal and a second drive signal, respectively; and
  a processor for generating the first drive signal and the second drive signal such that the first blocking pattern structure cooperates with the second blocking pattern structure to produce a series of blocking patterns by shifting the first portion and the second portion, that are exposed to the electromagnetic energy, and to capture a set of output values from the single pixel sensor such that each output value is responsive to one of the series of blocking patterns for forming an image of the scene based on the set of output values associated with the series of blocking patterns.

29. The system of claim 28 wherein the first and second blocking pattern structures are formed as first and second rigid at least generally planar substrates.

30. The system of claim 28 wherein the first and second blocking pattern structures are formed as first and second flexible tapes.

31. The system of claim 28 wherein the transport and the processor cooperate to move the first blocking pattern structure antiparallel to the second blocking pattern structure through said path.

32. The system of claim 28 wherein the transport and the processor cooperate to move the first blocking pattern structure transverse to the second blocking pattern structure through said path.

33. The system of claim 32 wherein the transport and the processor cooperate to move the first blocking pattern structure normal to the second blocking pattern structure through said path.

* * * * *